US007873776B2

(12) United States Patent
Hetherington et al.

(10) Patent No.: US 7,873,776 B2
(45) Date of Patent: Jan. 18, 2011

(54) MULTIPLE-CORE PROCESSOR WITH SUPPORT FOR MULTIPLE VIRTUAL PROCESSORS

(75) Inventors: Ricky C. Hetherington, Pleasanton, CA (US); Bikram Saha, Cupertino, CA (US)

(73) Assignee: Oracle America, Inc., Redwood City, CA (US)

( * ) Notice: Subject to any disclaimer, the term of this patent is extended or adjusted under 35 U.S.C. 154(b) by 561 days.

(21) Appl. No.: 11/063,793

(22) Filed: Feb. 23, 2005

(65) Prior Publication Data
US 2006/0004942 A1 Jan. 5, 2006

Related U.S. Application Data

(60) Provisional application No. 60/584,064, filed on Jun. 30, 2004.

(51) Int. Cl.
*G06F 12/00* (2006.01)
*G06F 12/06* (2006.01)
(52) U.S. Cl. .................................. 711/5; 711/E12.023
(58) Field of Classification Search ...................... 711/5
See application file for complete search history.

(56) References Cited

U.S. PATENT DOCUMENTS

| | | | |
|---|---|---|---|
| 4,754,394 A | | 6/1988 | Brantley et al. |
| 5,692,193 A | * | 11/1997 | Jagannathan et al. ........ 718/106 |
| 5,721,828 A | | 2/1998 | Frisch |
| 5,737,765 A | | 4/1998 | Shigeeda |
| 5,745,913 A | | 4/1998 | Pattin et al. |
| 5,752,255 A | | 5/1998 | Jarvis |

(Continued)

FOREIGN PATENT DOCUMENTS

EP   1 164 495   12/2001

(Continued)

OTHER PUBLICATIONS

"Operating Systems Widely Used on Personal Computer"; http://web.archive.org/web/20011109175038/http://www.abilityhub.com/information/os.htm; Nov. 9, 2001; Copyright AbilityHub.com.*

(Continued)

*Primary Examiner*—Matt Kim
*Assistant Examiner*—Christopher D Birkhimer
(74) *Attorney, Agent, or Firm*—Robert C. Kowert; Meyertons, Hood, Kivlin, Kowert & Goetzel, P.C.

(57) ABSTRACT

A multiple-core processor with support for multiple virtual processors. In one embodiment, a processor may include a cache including a number of cache banks, a number of processor cores and core/bank mapping logic coupled to the cache banks and processor cores. During a first mode of processor operation, each of the processor cores may be configurable to access any of the cache banks, and during a second mode of processor operation, the core/bank mapping logic may be configured to implement a plurality of virtual processors within the processor. A first virtual processor may include a first subset of the processor cores and a first subset of the banks, and a second virtual processor may include a second subset of the processor cores and a second subset of the cache banks. Subsets of processor cores and cache banks included in the first and second virtual processors may be distinct.

17 Claims, 12 Drawing Sheets

U.S. PATENT DOCUMENTS

| | | | |
|---|---|---|---|
| 5,843,799 | A | 12/1998 | Hsu et al. |
| 6,035,374 | A * | 3/2000 | Panwar et al. ............... 711/118 |
| 6,049,856 | A | 4/2000 | Bolyn |
| 6,058,475 | A | 5/2000 | McDonald et al. |
| 6,119,185 | A * | 9/2000 | Westerinen et al. ......... 710/104 |
| 6,182,203 | B1 | 1/2001 | Simar et al. |
| 6,226,734 | B1 * | 5/2001 | Kleinsorge et al. ............ 712/13 |
| 6,240,484 | B1 | 5/2001 | Witt |
| 6,240,490 | B1 | 5/2001 | Lyles et al. |
| 6,247,109 | B1 * | 6/2001 | Kleinsorge et al. ............ 712/13 |
| 6,298,426 | B1 | 10/2001 | Ajanovic |
| 6,314,471 | B1 | 11/2001 | Alverson et al. |
| 6,347,372 | B1 | 2/2002 | Takashima et al. |
| 6,360,333 | B1 | 3/2002 | Jansen et al. |
| 6,374,338 | B1 | 4/2002 | Garvey |
| 6,381,682 | B2 | 4/2002 | Noel et al. |
| 6,401,202 | B1 | 6/2002 | Abgrall |
| 6,470,422 | B2 | 10/2002 | Cai et al. |
| 6,493,770 | B1 | 12/2002 | Sartore et al. |
| 6,502,168 | B1 | 12/2002 | Arimilli et al. |
| 6,519,673 | B1 | 2/2003 | Chudnovsky et al. |
| 6,542,957 | B2 | 4/2003 | Miura et al. |
| 6,567,837 | B1 | 5/2003 | Robinson |
| 6,848,023 | B2 | 1/2005 | Teramoto |
| 6,871,264 | B2 | 3/2005 | Soltis, Jr. |
| 6,874,056 | B2 | 3/2005 | Dwyer et al. |
| 7,055,003 | B2 | 5/2006 | Cargnoni et al. |
| 7,240,160 | B1 | 7/2007 | Hetherington et al. |
| 5,287,480 | A1 | 2/2010 | Wahr |
| 2002/0073282 | A1 | 6/2002 | Chauvel et al. |
| 2002/0116469 | A1 | 8/2002 | Okuyama |
| 2002/0147851 | A1 | 10/2002 | Morimura et al. |
| 2003/0005225 | A1 * | 1/2003 | Smits ......................... 711/119 |
| 2003/0009629 | A1 | 1/2003 | Gruner et al. |
| 2003/0051099 | A1 | 3/2003 | Yoaz et al. |
| 2003/0088800 | A1 | 5/2003 | Cai |
| 2003/0172234 | A1 | 9/2003 | Soltis, Jr. |
| 2004/0123201 | A1 * | 6/2004 | Nguyen et al. ............... 714/736 |
| 2006/0004942 | A1 | 1/2006 | Hetherington et al. |

FOREIGN PATENT DOCUMENTS

WO          01/61500        8/2001

OTHER PUBLICATIONS

Derek Sisson; "Identifying Important Operating Systems"; http://web.archive.org/web/19991008110233/http://www.philosophe.com/audience/operating_systems.html; Oct. 8, 1999.*

Chris Wildermuth; "JNI Announces UNIX Driversuite for Solaris, LINUX, HP-UX, AIX"; http://web.archive.org/web/20001204201000/http://www.fibrechannel.org/press/jni000424a.html; Dec. 4, 2000.*

Peter Karlsson, "Comparison report on server operating systems"; http://web.archive.org/web/19991007200814/http://www.softwolves.pp.se/skola/comparison.html; Oct. 7, 1999.*

Parson et al., "A Framework for Simulating Heterogeneous Virtual Process," Simulation Symposium, 1999, Proceedings $32^{nd}$ Annual, Apr. 11-15, 1999, (11 pages).

Sen et al., "Synchronisation in a Multithread Processor," Communicating Process Architectures 2000, Sep. 2000, (pp. 137-144).

Alverson et al., "Tera Hardware-Software Cooperation," Tera Computer Company, 1997, (16 pages).

Alverson et al., "The Tera Computer System," Tera Computer Company, Jun. 1990, (6 pages).

Alverson et al., "Exploiting Heterogeneous Parallelism on a Multithreaded Multiprocessor," Tera Computer System, 1992, (10 pages).

Smith, "The End of Architecture,"$17^{th}$ Annual Symposium on Computer Architecture, May 29, 1990, (8 pages).

Ungerer et al., "A Survey of Processors with Explicit Multithreading," ACM Computing Surveys, vol. 34, No. 1, Mar. 2003, (35 pages).

Siegel, et al., "Logical Partition Mode Physical Resource Managemetn on the IBM eServer z990", IBM Journal of Research and Development, vol. 48, No. 3/4, May 6, 2004, pp. 535-543, XP002349838.

Chun Liu, et al., "Organizing the Last Line of Defense Before Hitting the Memory Wall for CMPs", High Performance Computer Architecture, 2004, HPCA-10, Proceeding, $10^{th}$ International Symposium on Madrid Spain, Feb. 14, 2004, IEEE, XP010778839, 5 pages.

Klonowski, et al., "AIX Version 4.3 to 5L Migration Guide," INET, 'Online! May 2003, XP002349839, 10 pages.

Tendler, et al., "POWER4 System Microarchitecture," IBM Journal of Research and Development, vol. 46, No. 1, Jan. 2002, XP002349840, pp. 6-8.

Parulkar, et al., "A Scalable, Low Cost Design-For-Test Architecture for UltraSPARC Chip Multi-Processors," Proceedings International Test Confrerence 2002, ITC 2002. IEEE, Oct. 7, 2002, XP010609802.

International Search Report and Written Opinion, PCT/US2005/023182, mailed Nov. 8, 2005, 16 pages.

U.S. Appl. No. 11/063,792, filed Feb. 23, 2005.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

*FIG. 3*

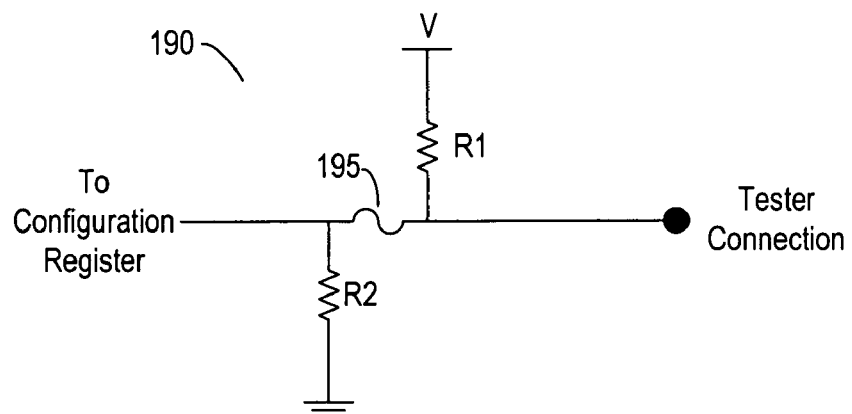
FIG. 5
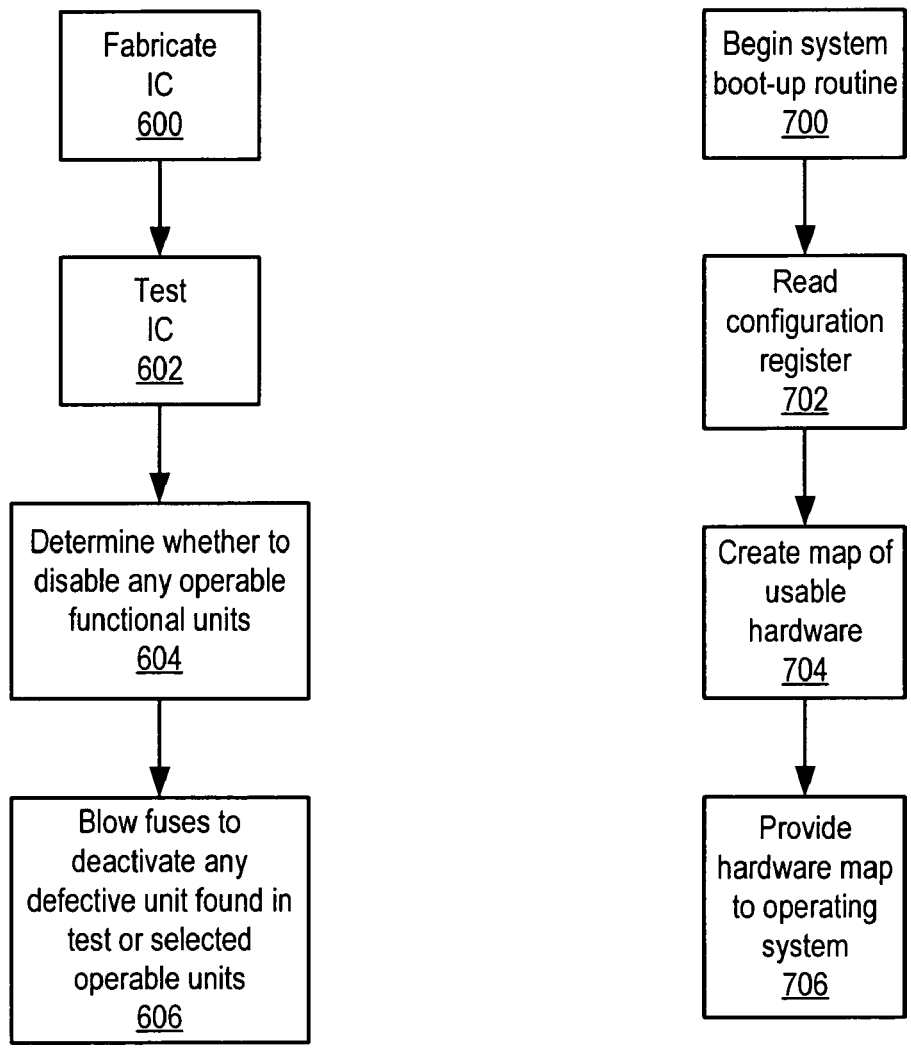
FIG. 6
FIG. 7

8-bank mode addressing 4-bank mode addressing 2-bank mode addressing

MULTIPLE-CORE PROCESSOR WITH SUPPORT FOR MULTIPLE VIRTUAL PROCESSORS

PRIORITY CLAIM

This application claims benefit of priority of U.S. Provisional Patent Application No. 60/584,064, entitled "Yield Recovery Technique for Integrated Circuits" and filed on Jun. 30, 2004.

BACKGROUND OF THE INVENTION

1. Field of the Invention

This invention relates to processors, and more particularly, to techniques for configuring virtual processors within a multiple-core processor.

2. Description of the Related Art

With increasing demands on functionality and performance as well as improved fabrication techniques, newer generations of processors and other integrated circuits have significantly higher levels of integration than their predecessors. Transistor counts in the hundreds of millions on an integrated circuit are not uncommon, and transistor counts of over one billion are inevitable.

Despite advances in integrated circuit fabrication processes, manufacturing devices having high transistor counts can be difficult. The number of transistors on an integrated circuit device results is correlated to the number of opportunities for defects to occur during the manufacturing process. The large number of defect opportunities present in the manufacturing process may in turn lead to a low yield and a significant number of scrapped parts. The low manufacturing yield may result in a higher per-unit cost for good units, and in some cases can make the manufacture of a design economically unfeasible.

Additionally, in some instances, different market segments may exist for compatible versions of processors and other types of integrated circuits having price and performance characteristics specific to a particular market segment. However, given the complexity and expense of designing a single version of a processor or other integrated circuit having a large transistor count, it may be impractical to separately design and manufacture a processor for each of several different market segments.

SUMMARY

A multiple-core processor with support for multiple virtual processors is disclosed. In one embodiment, a processor may include a cache including a number of cache banks. The processor may also include a number of processor cores as well as core/bank mapping logic coupled to the cache banks and processor cores. During a first mode of processor operation, each of the processor cores may be configurable to access any of the cache banks, and during a second mode of processor operation, the core/bank mapping logic may be configured to implement a plurality of virtual processors within the processor. A first virtual processor may include a first subset of the processor cores and a first subset of the banks, and a second virtual processor may include a second subset of the processor cores and a second subset of the cache banks. Processor cores and cache banks included in the first virtual processor may be distinct from processor cores and cache banks included in the second virtual processor.

A method is further contemplated that in one embodiment may include determining a respective desired configuration of each of a number of virtual processors, where a given respective desired configuration includes a specification of a respective subset of a number of processor cores and a respective subset of a number of cache banks, where the processor cores and cache banks may be implemented within a single processor. The method may also include defining each of the virtual processors to include the respective subsets of processor cores and cache banks according to the respective desired configuration. The method may further include separately executing program instructions on each of the virtual processors, where processor cores and cache banks included in a first virtual processor are distinct from processor cores and cache banks included in a second virtual processor.

BRIEF DESCRIPTION OF THE DRAWINGS

Other aspects of the invention will become apparent upon reading the following detailed description and upon reference to the accompanying drawings in which:

FIG. 3 is a pipeline diagram illustrating the flow of instructions through one embodiment of a processor core.

FIG. 5 is a circuit diagram of one embodiment of a simple circuit based on a fuse for indicating the status of a functional unit.

FIG. 6 is a flow diagram of one embodiment of a method for configuring a processor wherein certain units of the processor are to be disabled.

FIG. 7 is a flow diagram of one embodiment of a method for booting a computer system.

Figure 1:
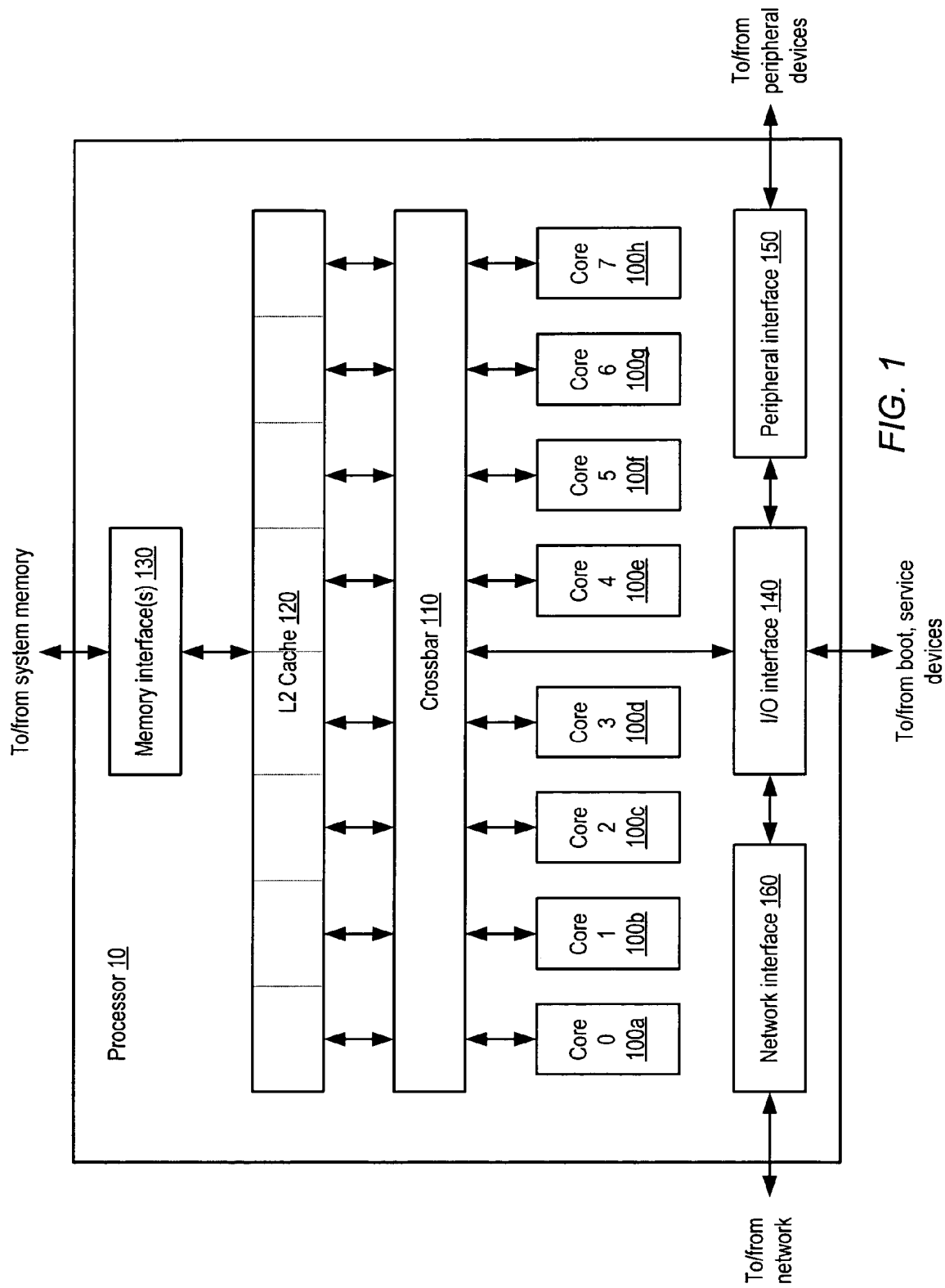
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
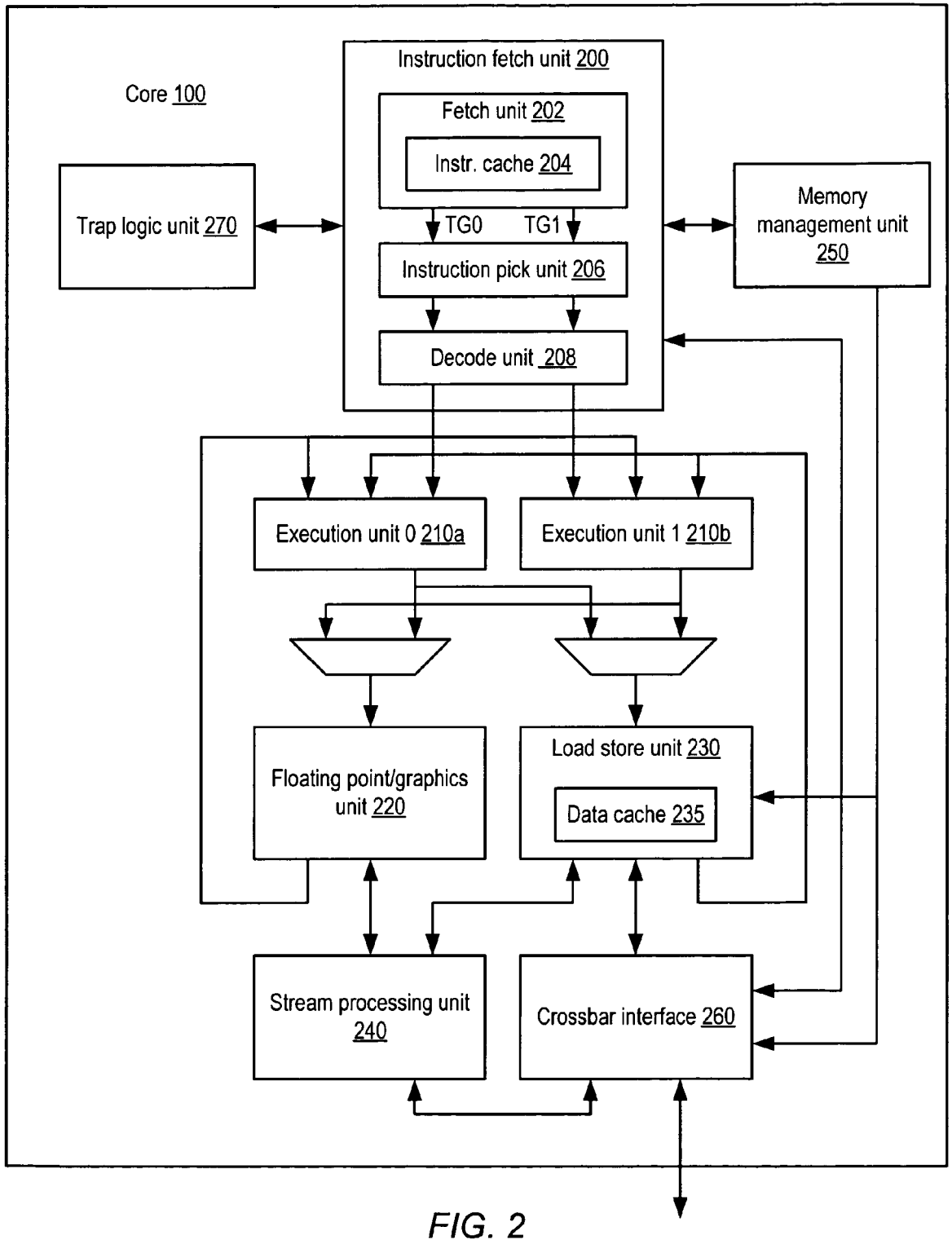
FIG. 2 is a block diagram illustrating one embodiment of a processor core.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction issue or execution. For example, in one embodiment SPU 240 may be configured to receive operations and operands via control registers accessible via software; in the illustrated embodiment SPU 240 may access such control registers via LSU 230. In such embodiments, SPU 240 may be indirectly programmed or configured by instructions issued from IFU 200, such as instructions to read or write control registers. However, even if indirectly programmed by such instructions, SPU 240 may execute independently without further interlock or coordination with IFU 200. In another embodiment SPU 240 may receive operations (e.g., instructions) and operands decoded and issued from the instruction stream by IFU 200, and may execute in response to such operations. That is, in such an embodiment SPU 240 may be configured as an additional functional unit schedulable from the instruction stream, rather than as an independent coprocessor.

In some embodiments, SPU 240 may be configured to freely schedule operations across its various algorithmic subunits independent of other functional unit activity. Additionally, SPU 240 may be configured to generate memory load and store activity, for example to system memory 810 described below. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Configuration of Partially Functional Devices

During the process of manufacturing and packaging processor 10 (e.g., during the integrated circuit manufacturing process), defects may occur that render one or more of the processor cores 100 and/or one or more of banks of L2 cache 120 defective and therefore unusable. Such defects may be detected during post-manufacturing tests of processor 10, for example. In spite of these failures, processor 10 may still be usable if some of the functional units are still operable. For example, processor 10 may be able to operate with four processor cores 100 (instead of the eight shown) and four banks of L2 cache 120 (instead of the eight shown). Broadly speaking, embodiments are possible and contemplated wherein processor 10 may operate with a single processor core 100 and a single bank of L2 cache 120. In some embodiments, depending upon the implementation (e.g., the number of memory interfaces 130 provided between L2 cache 120 and system memory), it may be required that cache banks are operated in pairs, and may also be required that the number of cache banks available be an integral power of 2 (e.g., the processor may require 2, 4, or 8 cache banks to be functional).

Additionally, in some embodiments it may be desirable to deliberately disable functional processor cores 100 and/or banks of L2 cache 120 of processor 10. For example, a manufacturer may wish to market differently-configured versions of processor 10 as different products targeted to different market segments. Versions of processor 10 that include more resources (e.g., 8 cores/banks) may be sold as one model or product for a higher price, for example as processors for server systems, while versions that include fewer resources (e.g., 1, 2, 4 or another number of cores/banks) may be sold as a different model or product for a lower price, for example as desktop system processors. In some instances, processors with defective functional units may be sold as a lower-end processor model as described above. However, defective units may not reliably supply demand for a given processor model. Further, design and mask work required to design versions of processor 10 including only the resources desired for the target product may be expensive and risky, particularly if demand for particular product versions is misjudged. Consequently, in some embodiments a single version of processor 10 may be manufactured. For certain units of processor 10, some number of processor cores 100 and/or banks of L2 cache 120 may be selectively disabled, and the resulting units may be marketed as a particular model or product distinct from a fully-functional version of processor 10. This process may also be referred to as productization.

Figure 4:
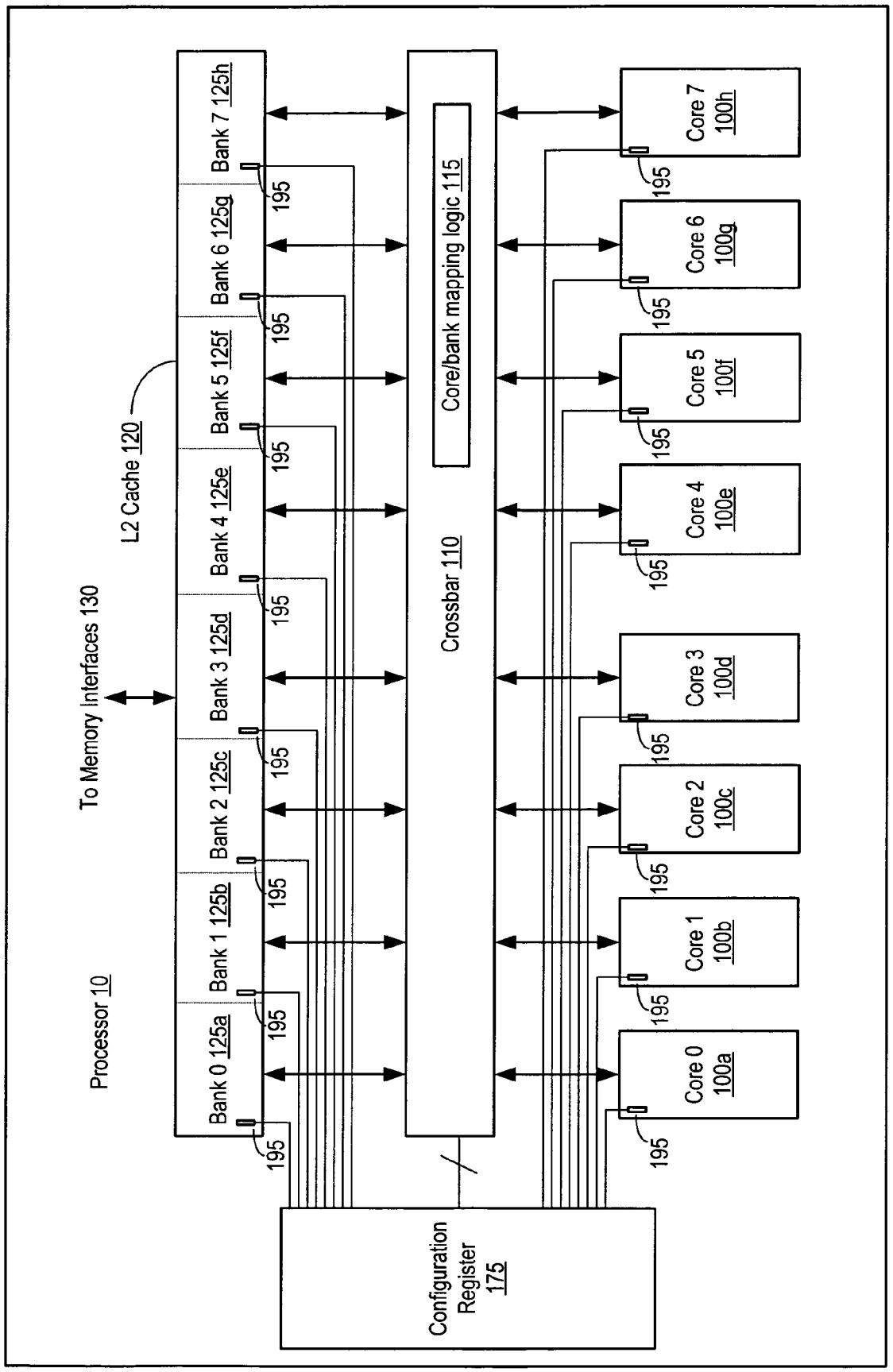
FIG. 4 is a block diagram illustrating one embodiment of a processor including a configuration register.

One embodiment of a processor 10 including a configuration register is shown in FIG. 4. The embodiment of processor 10 shown in FIG. 4 may be similar to the embodiment shown in FIG. 1, and may include some of the additional units (e.g., I/O interface 140) not explicitly shown here. As with the embodiment shown in FIG. 1, processor 10 includes various functional units, including logic units (e.g., processor cores 100) and storage banks (e.g., the banks of L2 cache 120, shown in FIG. 4 as banks 125a-h and also denoted banks 0-7). In the illustrated embodiment, processor 10 includes a configuration register 175, which may be capable of storing information related to the various units of the processor. Information stored in configuration register 175 may include the status of various functional units in processor 10. These functional units include each of the banks 125 (125a-125h) of L2 cache 120 and each of the processor cores 100 (100a-100h). Also, in the illustrated logic, crossbar 110 additionally includes core/bank mapping logic 115, described below. However, it is contemplated that in some embodiments, core/bank mapping logic 115 may be included within each of cores 100, within banks 125, or elsewhere within processor 10. It is also contemplated that the functions implemented by core/bank mapping logic 115 may be divided into different and/or redundant portions and implemented within different sections of processor 10.

Each processor core 100 and L2 cache bank 125 in the embodiment of FIG. 4 includes a fuse 195. Each fuse 195 may be used to indicate whether the respective unit in which it is implemented is functional or not. In one embodiment, a fuse may be blown if its respective unit is determined to be defective or inoperable, or if it is desired to disable the respective unit for any reason, such as the productization process described above. The fuse may be left intact (not blown) if the unit is operable and to be left enabled. Embodiments where the opposite fuse states apply to the operable and inoperable positions are possible and contemplated.

The state of each unit in processor 10 may be received by configuration register 175 via a connection with each fuse 195. The state for each unit may be written into a storage location in configuration register 175 when it is powered on. This state may be read by software during a start-up phase or power-on reset phase of an electronic system in which processor 10 is implemented. It is contemplated that in some embodiments, configuration register 175 may be implemented within crossbar 110, within L2 cache 120, or elsewhere within processor 10.

It is noted that virtually any type of storage circuit may be used to implement configuration register 175. In addition to embodiments where configuration register 175 is implemented using standard register logic, other embodiments are possible and contemplated wherein configuration register is implemented using a DRAM (dynamic random access memory), an SRAM (static random access memory) or any other suitable storage device.

A circuit diagram of one embodiment of a simple circuit based on a fuse for indicating the status of a functional unit is shown in FIG. 5. In the embodiment shown, fuse circuit 190 includes two resistors (R1 and R2) that are connected on opposite sides of fuse 195, effectively forming a voltage divider circuit. In this particular embodiment, the resistance value of R2 may be significantly greater than the resistance value of R1, thereby causing the voltage on the node occupied by fuse 195 to be pulled up to near the voltage V. This may be used to indicate a certain state of the functional unit in which fuse 195 is implemented, and such a state may be conveyed to configuration register 175 over a connection such as that shown in FIG. 4. Since the node occupied by fuse 195 is pulled up to near the voltage V, the state may be conveyed to configuration register 175 (and stored therein) as a logic '1'.

If it is necessary to convey a state opposite to that discussed in the previous paragraph, fuse 195 may be blown. In this embodiment of fuse circuit 190, fuse 195 may be blown via a tester connection to a test system. Through the tester connection, a test system may apply a voltage to the node occupied by fuse 195. If the proper voltage is applied to the tester connection, an amount of current sufficient to blow fuse 195 may be applied to the circuit. When fuse 195 is blown, the nodal connection between resistors R1 and R2 is broken, and thus the node coupled to configuration register 175 is pulled down to ground potential through resistor R2. This may result in a logic '0' being conveyed to and stored in configuration register 175.

It should be noted that this is only one possible circuit configuration involving the use of a fuse to indicate a state of a functional unit, and other circuit configurations are possible and contemplated.

A flow diagram illustrating one embodiment of a method for configuring an integrated circuit (IC), where certain units of the integrated circuit are defective or to be disabled for other reasons, is shown in FIG. 6. Operation begins in block 600 with the fabrication of an IC, such as processor 10 discussed above. After the IC has been fabricated, it may undergo one or more test procedures (block 602). These tests may be used to determine whether the IC is operable or not, and may further be used to determine whether or not various functional units within the IC are operable. Such functional units may include logic units (e.g., cores 100 of processor 10) and storage banks (e.g., the L2 cache banks 125 in processor 10). In addition to test procedures that assess the functionality of the IC, a determination as to whether to disable any operable functional units within the IC may be made (block 604). For example, a productization decision may be made to disable certain operable functional units to yield a particular configuration of the IC, as described above. It is contemplated that in some embodiments, a determination as to whether to disable any operable functional units may take into account the results of earlier testing.

As described above, an IC may still be useful even if some of its logic units and/or storage banks are defective or otherwise disabled. These logic units and/or storage banks may include fuses to indicate their state as effectively operable or inoperable as described above in conjunction with the descriptions of FIGS. 4-5. Thus, in the embodiment shown, the fuses may be blown to deactivate any defective units found during test, or operable units identified as a result of, e.g., a productization decision (block 606). It should be noted that embodiments are possible and contemplated wherein the fuses are blown to indicate that a particular unit is operable (rather than blown to indicate its being defective) are possible and contemplated.

A flow diagram of one embodiment of a method for booting a computer system while taking configuration information into account is illustrated in FIG. 7. The computer system may include at least one instance of a processor 10 such as the one discussed above in reference to FIG. 4. In the embodiment shown, operation begins in block 700 with the execution of a system boot-up routine that starts when the system is powered up. When the system is powered up, the state of the fuses 195 implemented in each of the processor cores 100 and banks 125 of L2 cache 120 may be written into configuration register 175, thereby allowing it to store the status (operable/inoperable) for each of these units.

At some point as the boot-up routine progresses, configuration register 175 may be read (block 702) to determine which processor cores 100 and banks 125 of L2 cache 120 are available for use. With the information read from configuration register 175, an indication or 'map' of usable hardware may be created (block 704). In one embodiment, such a map may include a representation in bits or bytes of data of the effectively operable and inoperable functional units of processor 10, as indicated by configuration register 175. For example, in an embodiment of processor 10 including 8 L2 cache banks 125 and 8 processor cores 100, the map may include respective bytes (i.e., 8 bits) corresponding to cache banks and processor cores, where an asserted bit in a byte of the map indicates that a corresponding cache bank 125 or processor core 100 is enabled for operation. The map may then be provided to operating system software (block 706). The operating system may use the map to determine which processor cores 100 are enabled and therefore may be provided with instructions. In some embodiments, the operating system may also use the map to determine which banks 125 of L2 cache 120 may be used for storage, although in other embodiments the management of enabled and disabled banks 125 may be performed transparently to an operating system by core/bank mapping logic 115 as described below.

It is contemplated that in some embodiments, productization of a processor 10 may be performed dynamically. For example, a given core 100 or cache bank 125 may be selectively disabled by assigning a value indicative of disablement (e.g., a logic 0) to a bit associated with the given core 100 or cache bank 125 within configuration register 175. Similarly, a given core 100 or cache bank 125 may be selectively enabled by assigning a value indicative of enablement (e.g., a logic 1) to the associated configuration register bit. Such selective disablement or enablement may be performed when configuration register 175 is accessed or when the resulting map of usable hardware is generated (e.g., during blocks 702 or 704 of FIG. 7), which may occur at boot time or during operation of processor 10. Selective disablement may be an alternative to permanently disabling a processor core 100 or cache bank 125 by blowing an associated fuse.

Such dynamic configuration of available functional resources may enable the configuration of processor 10 to be altered over time. For example, in one embodiment, processor resources such as cores 100 or cache banks 125 may be dynamically enabled or disabled dependent upon a level of performance purchased under an ongoing agreement with a user of processor 10. Such a user may elect to pay higher or lower costs or license fees in exchange for enabling a larger or smaller number of functional resources, respectively. Further, such a user may elect to alter the configuration and corresponding cost arrangement dynamically as circumstances warrant, such as on a real-time, monthly, or quarterly basis, for example.

In some embodiments, a given L2 cache bank 125 may be selected to service an access originating from a given one of processor cores 100 through the decode of a bank select portion of a memory address specified by the given processor core 100 for the access. For example, in an embodiment of processor 10 including 8 cache banks 125, three address bits of a memory address supplied to L2 cache 120 by the given processor core 100 may be decoded to determine which of the 8 cache banks 125 is targeted by a particular cache access. In various embodiments, the bank select portion of the memory address may include virtual or physical address bits, and may include contiguous or discontiguous bits of the memory address.

As described above, it is possible that some of L2 cache banks 125 may be deactivated, either due to defects or for other reasons. Further, the specific banks 125 that are deactivated may vary randomly among different instances of processor 10. For example, depending on the location and density of manufacturing defects, in one instance banks 0, 1, 4 and 5 of processor 10 may be defective and disabled, while in another instance, the affected banks may be 4, 5, 6 and 7. Consequently, the bank select portion of memory addresses issued by processor cores 100 may need to be mapped to any one of L2 cache banks 125, depending on the combination of banks 125 enabled in a particular configuration of processor 10.

Figure 8:
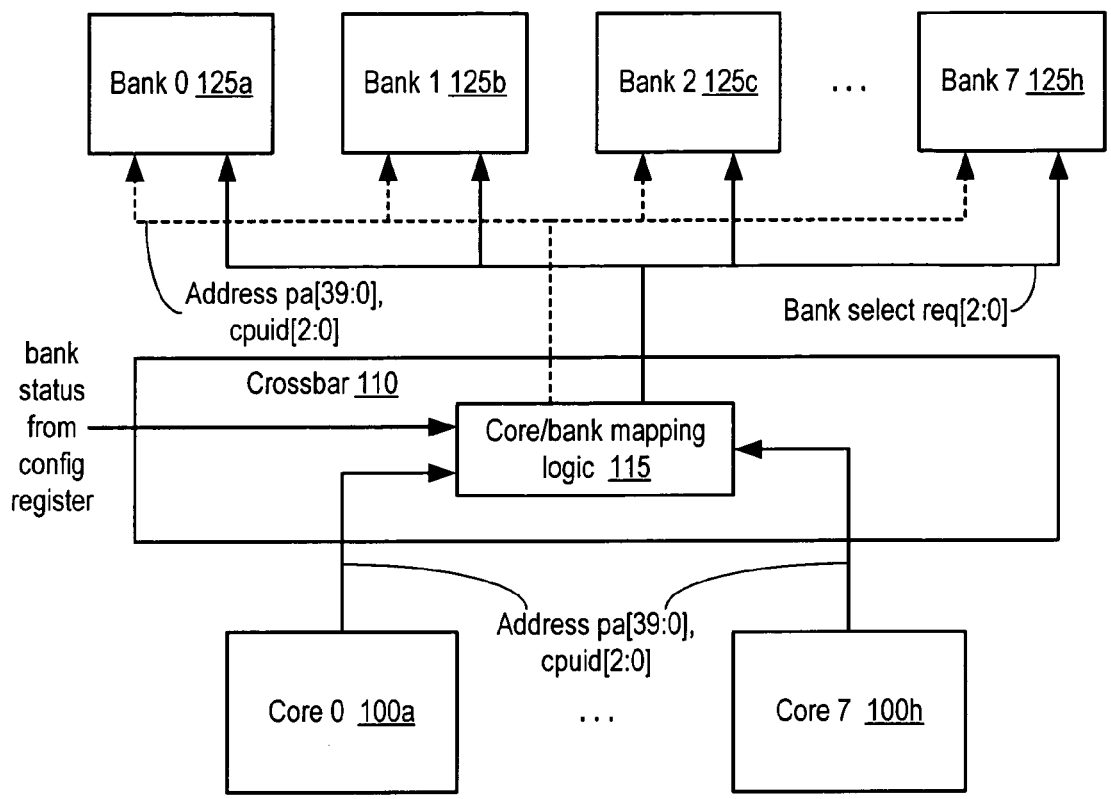
FIG. 8 is a block diagram illustrating one embodiment of core/bank mapping logic.

One embodiment of core/bank mapping logic 115 configured to perform such a mapping is illustrated in FIG. 8. In the illustrated embodiment, portions of processor 10 are shown while others have been omitted for clarity. Specifically, core/bank mapping logic 115 (which may also be referred to simply as mapping logic 115) is shown receiving a memory address from each of processor cores 100, as well as a unique identifier designating the particular core 100 from which a particular memory request was received. In the illustrated embodiment, the memory address is shown as a 40-bit physical memory address designated pa[39:0], and the unique identifier is shown as a 3 bit encoded field designated cpuid [2:0], with a respective value of the field corresponding to each of the eight cores 100 shown. However, it is contemplated that in other embodiments, the memory address and unique identifier may be of different widths and may employ different encodings. For example, some implementations of processor 10 may support a larger or smaller memory address space than the 40-bit address space shown. Also, some embodiments of processor 10 may implement more or fewer cores 100, or may implement the unique identifier using a different type of encoding.

As described in greater detail below, in one embodiment mapping logic 115 may be configurable to associate a particular value of a bank select portion of a memory address with any one of a number of L2 cache banks 125. For example, such a mapping may be employed in an instance of processor 10 in which fewer than all banks of L2 cache 120 are operable or enabled.

In one embodiment, mapping logic 115 may be configured to pass the memory address pa[39:0] and core identifier cpuid [2:0] along to L2 cache banks 125 unmodified for use in completing a cache access operation, although as described below, in some embodiments these fields may be further modified within banks 125 or within mapping logic 115. In the illustrated embodiment, mapping logic 115 is further configured to decode and map a bank select portion of the memory address pa[39:0] corresponding to a particular cache access and to provide the mapped bank select portion of the address as a 3-bit encoded bank select signal designated req [2:0], where each cache bank 125 corresponds to a respective value of req[2:0]. As with the unique core identifier field described above, in other embodiments the mapped bank select signal determined by mapping logic 115 may be represented using different encodings or semantics.

As described above, in one embodiment configuration register 175 may be configured to store information indicative of the particular cache banks 125 that are active and available for use in a given instance of processor 10, such as status bits corresponding to the various cache banks 125. In one particular embodiment of processor 10, cache banks 125 may be activated and deactivated in pairs of adjacent banks, such that if one bank 125 of a pair is deactivated, its companion bank 125 is also deactivated. For example, the eight cache banks 125 shown in FIG. 8 may be implemented as four pairs including banks 0-1, banks 2-3, banks 4-5 and banks 6-7, respectively. Correspondingly, in one such embodiment configuration register 175 may include an indication, such as a status bit, associated with each of the four pairs of banks 125. In some embodiments, pairwise enabling and disabling of cache banks 125 may simplify the mapping function performed by mapping logic 115. In other embodiments, it is contemplated that cache banks 125 may be enabled or disabled on an individual bank basis or in groupings other than pairs.

In one embodiment, mapping logic 115 may use bank availability information provided by configuration register 175 in the course of mapping the bank select portion of a memory address to a particular cache bank 125. One exemplary mapping that may be implemented by mapping logic 115 is given by the truth table shown in Table 1.

TABLE 1

| PM | Available Banks (AB) | | | | | req [2] | req [1] | req [0] |
|----|-----|-----|-----|-----|---------|---------|---------|---------|
|    | b67 | b45 | b23 | b01 |         |         |         |         |
| 0 | x | x | x | x |         | pa [8]   | pa [7]   | pa [6] |
| 1 | 0 | 0 | 0 | 0 | illegal | 0        | 0        | pa [6] |
| 1 | 0 | 0 | 0 | 1 |         | 0        | 0        | pa [6] |
| 1 | 0 | 0 | 1 | 0 |         | 0        | 1        | pa [6] |
| 1 | 0 | 0 | 1 | 1 |         | 0        | pa [7]   | pa [6] |
| 1 | 0 | 1 | 0 | 0 |         | 1        | 0        | pa [6] |
| 1 | 0 | 1 | 0 | 1 |         | pa [7]   | 0        | pa [6] |
| 1 | 0 | 1 | 1 | 0 |         | pa [7]   | ~pa [7]  | pa [6] |
| 1 | 0 | 1 | 1 | 1 | illegal | 0        | pa [7]   | pa [6] |
| 1 | 1 | 0 | 0 | 0 |         | 1        | 1        | pa [6] |
| 1 | 1 | 0 | 0 | 1 |         | pa [7]   | pa [7]   | pa [6] |
| 1 | 1 | 0 | 1 | 0 |         | pa [7]   | 1        | pa [6] |
| 1 | 1 | 0 | 1 | 1 | illegal | 0        | pa [7]   | pa [6] |
| 1 | 1 | 1 | 0 | 0 |         | 1        | pa [7]   | pa [6] |
| 1 | 1 | 1 | 0 | 1 | illegal | 1        | pa [7]   | pa [6] |
| 1 | 1 | 1 | 1 | 0 | illegal | 1        | pa [7]   | pa [6] |
| 1 | 1 | 1 | 1 | 1 |         | pa [8]   | pa [7]   | pa [6] |

In the illustrated truth table, bank availability information from configuration register 175 is shown as the Available Banks (AB) field, given for pairs of banks 125 as described above. Additionally, in one embodiment, configuration register 175 may store an additional indication of whether all or only some banks 125 are enabled. This indication is shown in the illustrated truth table as the Partial Mode (PM) signal, which if asserted may indicate that only some of banks 125 are enabled. Use of the PM signal may simplify the implementation of mapping logic 115 in some embodiments, but may be omitted in other embodiments.

The illustrated mapping assumes that when all of banks 125 are enabled, memory address bits pa[8:6] are directly mapped to bank select signal req[2:0], as shown in the first and last rows of the truth table. That is, address bits pa[8:6] may be directly decoded to identify one of the 8 cache banks 125 to which a given cache access should be steered. As noted previously, different memory address bits may be mapped as the bank select signal in other embodiments.

The illustrated mapping further assumes that the number of banks enabled is an even power of 2 (e.g., 2, 4 or 8 banks). Such an assumption may simplify the implementation of mapping logic 115 in some embodiments, but is not essential. Under this assumption, truth table entries that indicate the availability of 6 banks are indicated as "illegal", although in some embodiments mapping logic 115 may perform a default mapping for these cases as shown in the truth table. It is noted that in the mapping illustrated in Table 1, the first row (in which PM=0) and the last row (in which PM=1 and all bank enables are asserted) may be functionally equivalent and therefore redundant. In some embodiments, the encoding of the last row may be disallowed as illegal, while in other embodiments the encoding may be considered legal even though redundant.

When fewer than all banks 125 are enabled, fewer than all bits of the bank select portion of the memory address may be needed to select a particular bank 125. For example, when two or four banks 125 are enabled, only one or two bits of the bank select portion of the address, respectively, may be needed to differentiate among the enabled banks 125. Consequently, in the illustrated mapping, address bit pa[6] is used for bank selection in a two-bank addressing mode, while address bits pa[7:6] are used in a four-bank addressing mode. However, as noted above, the two or four enabled banks 125 may be any valid combination of the implemented banks 125. To account for this variation, mapping logic 115 may be configured to decode the bank select signal req[2:0] dependent upon the particular available banks that are indicated.

For example, in the illustrated embodiment, there exist four possible modes in which two cache banks 125 are enabled. If banks 0 and 1 are enabled, then for a given request to L2 cache 120, mapping logic 115 may assign the value '00' to bank select signal req[2:1], while mapping address bit pa[6] to bank select signal req[0]. As a result, requests to L2 cache 120 may be steered to either bank 0 or bank 1 depending on address bit pa[6], and to no other bank 125 (e.g., to no disabled bank 125). In contrast, if banks 4 and 5 are enabled, mapping logic 115 may assign the value '01' to bank select signal req[2:1], resulting in requests to L2 cache 120 being steered exclusively to bank 2 or bank 3. Similar mappings for accesses when four cache banks 125 are enabled are given in the illustrated truth table.

It is noted that in one embodiment, mapping logic 115 may be configured to map a bank select portion of a memory address, and thus to effectively steer a corresponding cache access, in a manner that is transparent to processor cores 100 but which comprehends any possible valid configuration of banks 125. That is, mapping logic 115 may enable any core 100 to access any enabled one of banks 125 depending upon the specific configuration of banks 125, which may or may not be known to cores 100. It is contemplated that the specific mappings implemented by mapping logic 115 may vary in various embodiments. For example, as noted above, in some embodiments banks 125 need not be enabled in adjacent pairs, and the combination of enabled banks 125 need not be an even power of two.

Figure 9:
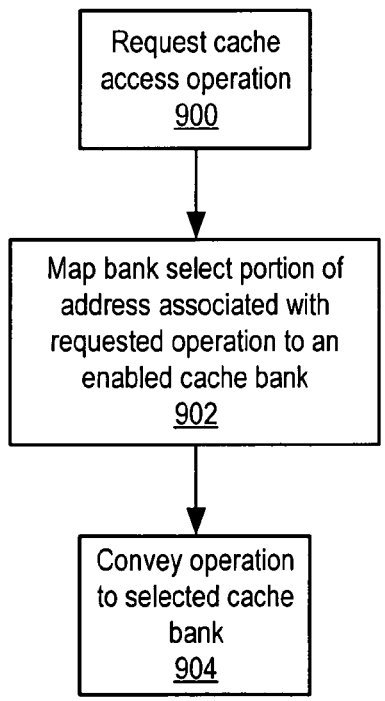
FIG. 9 is a flow diagram of one embodiment of a method of mapping a bank select portion of a memory address to a particular cache bank.

While the mapping function illustrated by the exemplary truth table given in Table 1 may be implemented within mapping logic 115 as just described, in some embodiments of processor 10 this mapping may be implemented within cache banks 125 or as software or hardware within processor cores 100. One embodiment of a method of mapping a bank select portion of a memory address to a particular cache bank is illustrated in FIG. 9. Referring collectively to FIG. 1-9, operation begins in block 900 where a cache access operation is requested. For example, one of cores 100 may issue a load or store operation that results in an access to L2 cache 120, e.g.

Subsequently, a bank select portion of a memory address associated with the requested cache access operation is mapped to an available or enabled cache bank 125 (block 902). For example, mapping logic 115 may be configured to map all or a portion of bank select bits of the memory address to a bank select signal, e.g., as illustrated in Table 1, taking into account available bank information that may be stored in configuration register 175. Following the mapping, the requested cache access operation is conveyed to the selected cache bank 125 (block 904). For example, in one embodiment crossbar 110 may convey the operation directly to the cache bank 125 decoded by mapping logic 115. In another embodiment crossbar 110 may convey the operation to L2 cache 120, which may queue or otherwise process the operation prior to forwarding it to the appropriate cache bank 125.

In many embodiments, the memory address associated with a cache access operation is decoded by its destination cache in a manner consistent with the geometry of the cache to determine what portion of the cache should be accessed to service the requested operation. For example, the number of banks, ways and sets included in the cache, the number of bytes in a set or line and/or other features of cache configuration may be taken into account. In some embodiments, selectively enabling or disabling banks 125 of L2 cache 120 may necessitate different decoding formats for cache access operations depending on the specific configuration of L2 cache 120. For example, altering the number of enabled banks 125 may affect the number of address bits needed to decode a particular bank 125, which may in turn impact the specific address bits used to select sets, ways, or other cache features.

Figure 10:
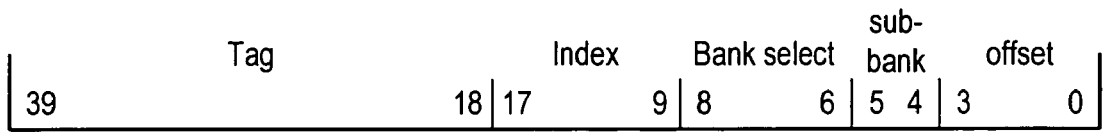
FIG. 10 illustrates several different address decoding formats.
Figure 10:
Figure 10:
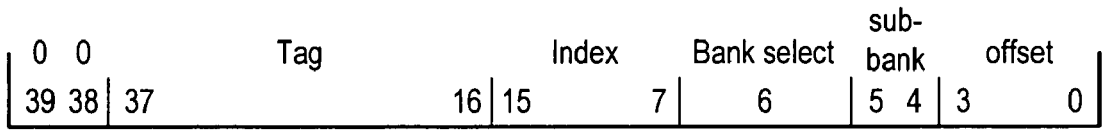

Several different address decoding formats for 8-bank, 4-bank and 2-bank configurations of L2 cache 120 are illustrated in FIG. 10, for an embodiment of processor 10 configured to support a 40-bit physical address. In the illustrated embodiment, it is assumed that L2 cache 120 is a 4 megabyte (MB) cache including 8 cache banks 125 of 512 kilobytes (KB) each. It is further assumed that each cache bank 125 is 16-way set associative, with 512 sets per bank and a line size (i.e., the number of bytes per way in a given set) of 64 bytes. However, other geometries for L2 cache 120 are possible and contemplated, as are other supported physical address widths. It is contemplated that the field definitions shown in FIG. 10 may be adjusted according to the particular physical or virtual address width and L2 cache geometry implemented by a given embodiment of processor 10.

When all 8 banks 125 are enabled in the illustrated embodiment, the full 40-bit physical address is decoded as shown. Specifically, address bits 39:18 are used as a tag field to determine whether a line matching the address is included in one of the 16 cache ways. Address bits 17:9 are used to select one of the 512 sets, while address bits 8:6 are used to select one of the eight cache banks 125. Within the 64-byte line in the selected bank, address bits 5:4 select a particular 16-byte sub-bank, and address bits 3:0 select a particular offset within the 16-byte sub-bank at which the address is aligned.

As described above and shown in Table 1, in some embodiments fewer bank select address bits may be required when fewer than all cache banks 125 are enabled. Specifically, in 2-bank mode and 4-bank mode, only one or two bank select address bits may be required. Correspondingly, in one embodiment L2 cache 120 may be configured to adjust its address decode to reflect the narrower bank select field used in partial-bank modes of operation.

As illustrated in FIG. 10, in one embodiment L2 cache 120 may be configured to remap various fields of the physical address in 2-bank and 4-bank modes, respectively. Specifically, in a 4-bank mode of operation, L2 cache 120 may interpret address bit 39 as a logical 0, and may decode address bit ranges 38:17 and 16:8 as the tag and index fields, respectively. Address bits 7:6 may decode one of the four enabled cache banks 125 in conjunction with mapping logic 115 as described above. Decoding of address bits 5:0 may be similar to that for 8-bank mode described above.

Similarly, in a 2-bank mode of operation, L2 cache 120 may interpret address bits 39:38 as logical 0s, and may decode address bit ranges 37:16 and 15:7 as the tag and index fields, respectively. Address bit 6 may decode one of the two enabled cache banks 125, also in conjunction with mapping logic 115. Decoding of address bits 5:0 may be similar to that for 8-bank mode described above. It is noted that although the illustrated remapping resembles a shift operation, in one embodiment, L2 cache 120 may not actually perform a logical shift of bits 39:9 of the original physical address to result in the physical address used in 2-bank or 4-bank modes. Rather, L2 cache 120 may be configured to direct its decode of specific fields of the address to different bit ranges depending on the number of enabled banks 125, as shown in FIG. 10.

In one embodiment, the size of the tag field supported by L2 cache 120 may correspond to a fixed number of address bits (e.g., 22 bits in the embodiments illustrated in FIG. 10). In such an embodiment, the tag field may remain the same size irrespective of whether all or only some banks 125 are enabled. Consequently, when fewer than all banks 125 are enabled, certain address bits (such as the most significant address bits as shown in FIG. 10) may be effectively ignored, interpreted as logical zeros or don't-cares, etc. This may result in a reduction in the amount of the address space (and correspondingly, the amount of physical memory) that may be cached when fewer than all banks 125 are enabled. For example, in the embodiment of FIG. 10, the illustrated address mappings for 4- and 2-bank mode may result in a reduction in the cacheable address space by a factor or 2 or 4, respectively. However, it is contemplated that in some embodiments, L2 cache 120 may support variable-width tags, for example by building sufficient storage within a tag array to store the largest expected tag for all anticipated modes of cache bank operation. In such an embodiment, all bits of the memory address may be considered by L2 cache 120 regardless of the mode of operation, and no reduction in cacheable address space may occur. For example, in one such embodiment the tag field may correspond to address bits 39:18 (22 bits) in 8-bank mode, 39:17 (23 bits) in 4-bank mode, and 39:16 (24 bits) in 2-bank mode.

Cache Directory Configuration in Partial Bank Mode

As illustrated in FIG. 2, in some embodiments, processor cores 100 may include one or more first-level caches, such as instruction cache 204 and/or data cache 235. Generally speaking, in systems where two or more copies of data may concurrently exist within the system (e.g., in two or more caches, for example), the possibility for data incoherence may exist. For example, if two processor cores 100 were each to maintain a copy of a data value located at a particular memory address within their respective data caches 235, and one of the cores 100 were to modify its copy of the data value, the data value stored by the other core 100 would no longer reflect the most current update to the data value. That is, without further intervention, the data value may become incoherent, as it may exist in different states within different cores 100. In some instances, software that depends upon data that has become incoherent may execute incorrectly, which may result in system failure. Data coherence within a system is also referred to equivalently as cache coherence, although coherence may be an issue whenever independent copies of data may exist in a system, including non-cache structures. As used herein, "cache coherence" encompasses all such coherence scenarios irrespective of whether true caches are involved.

One method of preventing data from becoming incoherent is to prevent multiple copies of data from existing within a system at all, for example by eliminating first-level caches and configuring cores 100 to share a single, common cache. However, such a brute-force approach may severely hamper system performance. For example, attempting to share a single cache between more two or cores 100 may result in substantial resource contention, where cores 100 stall waiting for access to the shared resource.

In some embodiments of processor 10, coherency among multiple copies of data residing in different processor cores 100 may be maintained by actively tracking the state of copies of data and taking action in response to changes in data state according to a particular cache coherence protocol. For example, in one embodiment, if two cores 100 hold respective copies of a data value within their first-level caches and one core 100 subsequently modifies its copy of the data value, the copy of the data value may be invalidated within the other core 100. That is, the other core 100 may receive a message or notification that it should no longer rely on its copy of the data value, but should instead retrieve a current copy of the value from the modifying core 100 or another source.

Numerous different cache coherence protocols are possible and contemplated. Different protocols may track data state to different degrees and enforce different types of coherence policies. For example, a simple cache coherence protocol may include a small number of data states that may be assigned to a particular data copy, such as invalid, modified, or shared-and-unmodified. More complex protocols may include additional state distinctions relating to possible data configurations among different caches or data stores. Additionally, a cache coherence protocol may enforce various policies pertaining to allowable configurations of data copies within processor 10. For example, in one embodiment, a cache coherence protocol may allow multiple copies of a data value to reside in different data caches 235 of different cores 100, but may prevent multiple copies of that data value from being stored in both an instruction cache 204 and a data cache 235, either on the same core 100 or across different cores 100. In some embodiments, cache coherence policies may be configured to interact with other types of cache policies, such as cache eviction and writeback policies.

In some embodiments of processor 10, L2 cache 120 may include a cache coherence directory. Generally speaking, a cache coherence directory (also referred to as a cache directory) is a structure configured to store coherence state information. For example, a cache directory may in various embodiments be configured to store the identity or identities (e.g., the cpuid) of each core 100 in which copy of a given data value is located. Such a directory configuration may also be referred to as a conventional cache directory. In one embodiment of a conventional directory, accesses to a specific second-level cache line or block tracked by the directory may yield information about corresponding first-level cache lines or blocks. Alternatively, in some embodiments a cache directory may be configured to receive accesses corresponding to first-level cache lines or blocks and to provide coherence information regarding corresponding second-level cache lines or blocks. This configuration may also be referred to as a reverse cache directory. Although the embodiments discussed below primarily illustrate reverse cache directories, it is contemplated that the described methods and techniques may apply equally to conventional cache directories.

In some embodiments, the coherence state of the data value with respect to each core 100 (e.g., modified, invalid, etc.) may be stored in a directory along with the identity of each relevant core 100. In other embodiments, a cache directory may be configured to track coherence state of a data value with respect to all cores 100 within processor 10, regardless of whether a particular core 100 includes a copy of the data value. For example, cores 100 that do not include any copy of a particular data value may be indicated as invalid with respect to that data value along with cores 100 whose copies have been deliberately invalidated. In some embodiments, coherence may be managed on an L2-cache line basis rather than an individual data value basis. For example, a modification or other coherence-state-relevant operation by a core 100 to any portion of data corresponding to a particular L2 cache line may be considered an operation on the entire cache line for the purposes of managing coherence.

Figure 11:
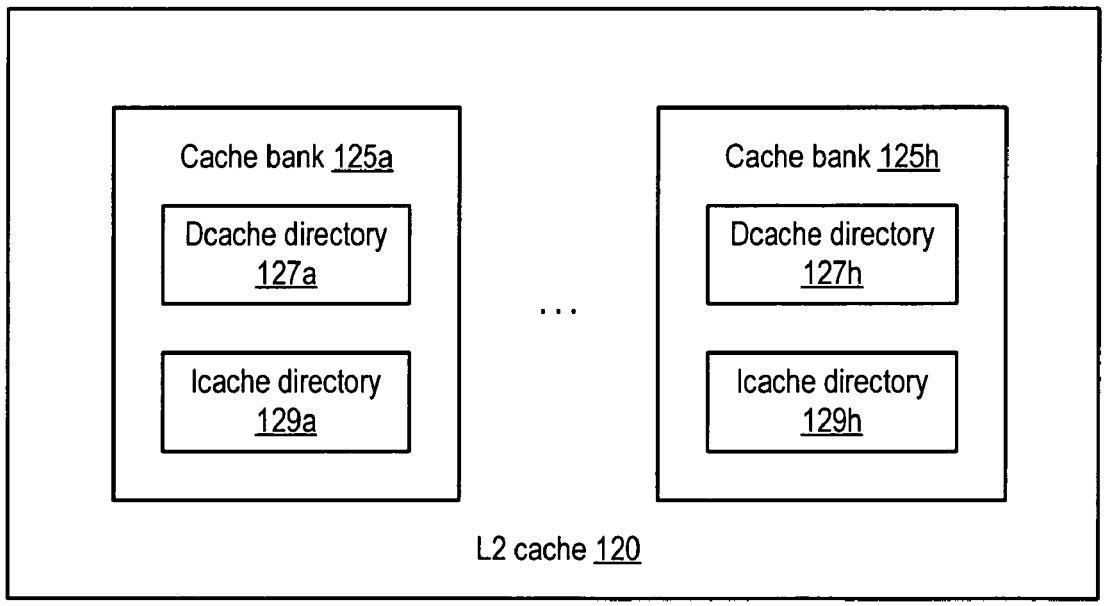
FIG. 11 is a block diagram illustrating one embodiment of a level-two cache including cache directories.

In one embodiment, L2 cache 120 may include a cache directory corresponding to each L2 cache bank 125. One such embodiment is illustrated in FIG. 11. In the illustrated embodiment, each of cache banks 125*a-h* includes a respective data cache (dcache) directory 127*a-h* and a respective instruction cache (icache) directory 129*a-h*, although for clarity some cache banks and directories are not shown. In some embodiments, it is contemplated that dcache directories 127 and icache directories 129 may be implemented externally to cache banks 125 while maintaining a respective directory—cache bank correspondence.

In the illustrated embodiment, dcache directories 127 and icache directories 129 may be configured to track coherence status with respect to individual lines of each data cache 235 and each instruction cache 204, which in some embodiments may be of a different size than the lines of L2 cache 120. For example, in one embodiment, each data cache 235 may be configured as a 4-way set-associative 8 KB cache including 128 sets of 64 bytes each, resulting in a line size of 16 bytes per set, per way. In such an embodiment, each data cache 235 may include 512 16-byte lines, for a total of 4096 16-byte lines across 8 cores 100. Correspondingly, dcache directories 127 may be collectively configured to track the coherence status of the 4096 lines in all 8 instances of data cache 235. Similarly, in one embodiment, each instruction cache 204 may be configured as an 8-way set-associative 16 KB cache including 64 sets of 256 bytes each, resulting in a line size of 32 bytes per set, per way. This geometry yields 512 32-byte lines per instruction cache 204, also totaling 4096 32-byte lines across 8 cores 100, the coherence status of which may be collectively tracked by icache directories 129. In other embodiments, it is contemplated that other first-level cache geometries, numbers of cores 100 or numbers of directories 127 or 129 may be employed without loss of generality.

Depending on the addressing scheme used to index the first-level caches and to select individual L2 cache banks 125, it is possible that the cache lines of a given data cache 235 or instruction cache 204 may correspond to more than one dcache directory 127 or icache directory 129. Conversely, a given directory may include coherence state information associated with first-level caches associated with more than one core 100. For example, in a typical implementation of the data cache geometry given above (4 ways, 128 sets, 16 byte lines), seven memory address bits may be decoded by an instance of data cache 235 to select one of the 128 sets, while four memory address bits may be decoded to determine an offset within the 16-byte line. Commonly, the offset is decoded from the least significant bits of the memory address, e.g., pa[3:0], while the index is decoded from the next least significant bits of the memory address, e.g., pa[10:4].

However, in some embodiments as described above, an L2 bank select portion of the memory address may partially or completely overlap the portion of the memory address used to index data caches 235. For example, in one embodiment, pa[8:6] may be used in an 8-bank mode to select one of the 8 cache banks 125. As a consequence of this overlap, in one embodiment different lines of a given data cache 235 may map to dcache directories 127 associated with different L2 cache banks 125. For example, in one embodiment the cache lines associated with each of data caches 235 may be evenly distributed across all 8 dcache directories 127. That is, each dcache directory 127 may be configured to store directory information for 64 lines from each of the 8 data caches 235, for a total of 512 lines per directory, or 4096 lines across all 8 directories.

A similar analysis may be performed with respect to instruction caches 204 and icache directories 129. For example, given the exemplary instruction cache geometry given above (8 ways, 64 sets, 32 byte lines), six address bits may be used to decode one of the 64 sets, while 5 address bits may be used to decode an offset within the 32-byte line. If these bits correspond to the least significant portion of the memory address as described above, pa[4:0] may correspond to the offset, and pa[10:5] may correspond to the set index. Thus in some embodiments, lines of instruction caches 204 may be distributed across instances of icache directories 129 in a manner similar to that described above for the data cache case.

Figure 12:
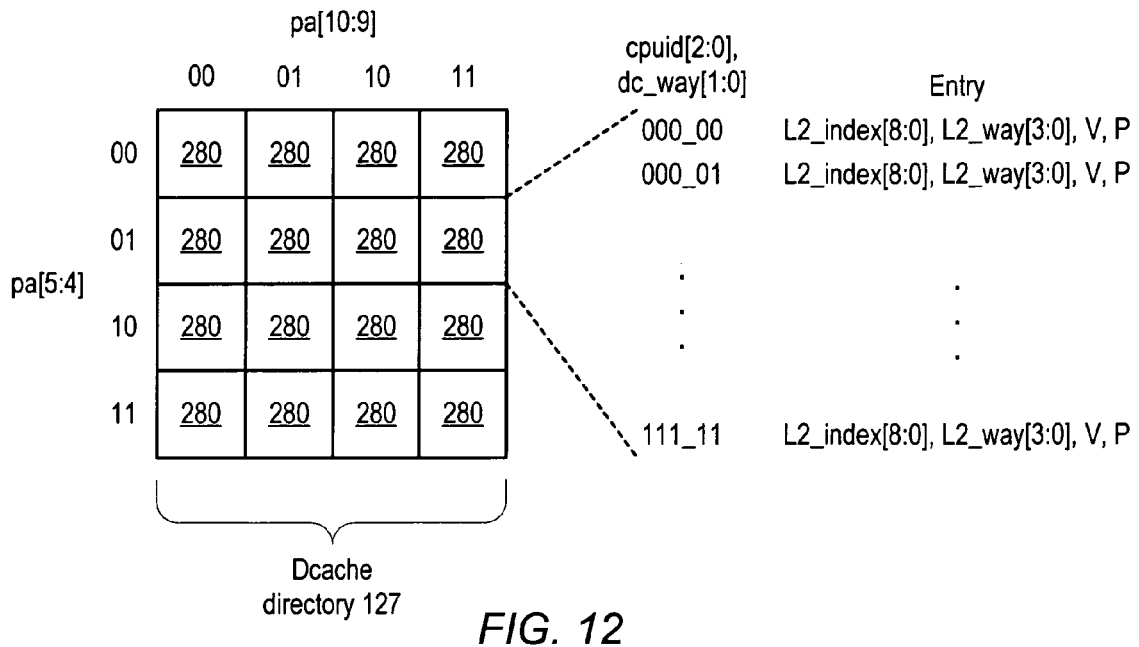
FIG. 12 is a block diagram illustrating an exemplary embodiment of a data cache directory.

One exemplary embodiment of an instance of dcache directory 127 is illustrated in FIG. 12. In the illustrated embodiment, dcache directory 127 is configured according to the exemplary data cache geometry given above. Specifically, dcache directory 127 may be configured to store coherence state information corresponding to 512 lines of data caches 235, distributed across 8 cores 100. Dcache directory 127 may be configured to include 16 panels 280, each of which includes 32 entries, where each entry corresponds to a line of a data cache 235.

During an 8-bank mode of operation of L2 cache 120, a particular entry of dcache directory 127 may be referenced on behalf of a given data cache 235 of a given core 100, for example to ensure that appropriate data cache lines are invalidated in the case of write activity, to ensure that a loaded or fetched cache line resides in a data cache 235 or an instruction cache 204, but not both, or for other coherence-related activities depending on the coherence protocol and policies implemented by processor 10. In the illustrated embodiment, a particular entry may be referenced by first selecting a particular panel 280 by decoding address bits pa[10,9,5,4]. It is noted that address bits pa[8:6] may have already been decoded to select a particular L2 cache bank 125 and thus a particular dcache directory 127.

Once a particular panel 280 has been selected, one of its 32 entries may be selected by further specifying the unique identity of the core 100 requesting the directory entry (e.g., cpuid [2:0]) and by specifying which one of the four ways of that instance of data cache 235 corresponds to the request (illustrated as dc_way[1:0]). It is noted that the combination of address bits used to select the dcache directory 127 and a particular panel 280 (e.g., pa[8:6] and pa[10,9,5,4], respectively) may be sufficient to select a particular set within data caches 235. The core identifier cpuid[2:0] may then narrow the selected set to a particular instance of data caches 235, while the particular way within that instance may narrow the selection to a specific 16-byte line. It is contemplated that in various embodiments, the decoding to select a particular directory entry may occur in any suitable order. For example, dcache directory 127 may be configured to decode the core identifier or way prior to the relevant address bits.

In the illustrated embodiment, each entry of a given panel 280 includes directory state information identifying the location of the corresponding first-level cache line within L2 cache 120. Specifically, each entry may include the index and way of L2 cache 120 (shown as L2_index[8:0] and L2_way [3:0]) that identify the L2 cache line to which the first-level cache line corresponds. In other embodiments, the cache tag corresponding to the L2 cache line (e.g., as may be given by address bits pa[39:18] during 8-bank operation, as shown in FIG. 10) may be used instead of or in addition to index and way information. Each entry may also include a valid bit (V) configured to indicate whether the indicated first-level data cache line is valid in its corresponding data cache 235, and one or more parity bits (P) configured to provide error detection and/or correction for the entry. In other embodiments, each entry may be configured to store additional cache coherence state information associated with the corresponding data cache line, such as whether the line is modified, shared among multiple data caches 235, or other information depending on the implemented cache coherence protocol.

During the course of operation of cores 100, entries of dcache directories 127 may be accessed and updated in response to various events related to operation of data caches 235. For example, if a particular line is modified by a core 100 within its corresponding data cache 235, that core 100 may communicate the modification event to L2 cache 120. In some embodiments, the corresponding directory entry for that line may be updated to reflect that the line is modified. Further, entries within the relevant dcache directory 127 may be scanned to determine whether cache lines indexed similarly to the modified line exist in other cores. If so, in various embodiments L2 cache 120 may cause such lines to be invalidated or replaced with the modified line. In some embodiments, L2 cache 120 may be configured to determine whether to invalidate a given line dependent upon tag information associated with the line as well as index bits identifying the line within the directory. Numerous other circumstances in which dcache directories 127 may be consulted are possible and contemplated. For example, in some embodiments where cache lines are prohibited from residing in both an instruction cache and a data cache by the implemented coherence policy, dcache directories 127 may be accessed in response to an instruction cache fetch miss to ensure that the line supplied to service the fetch miss is invalidated within any data caches 235 in which it may reside.

Figure 13:
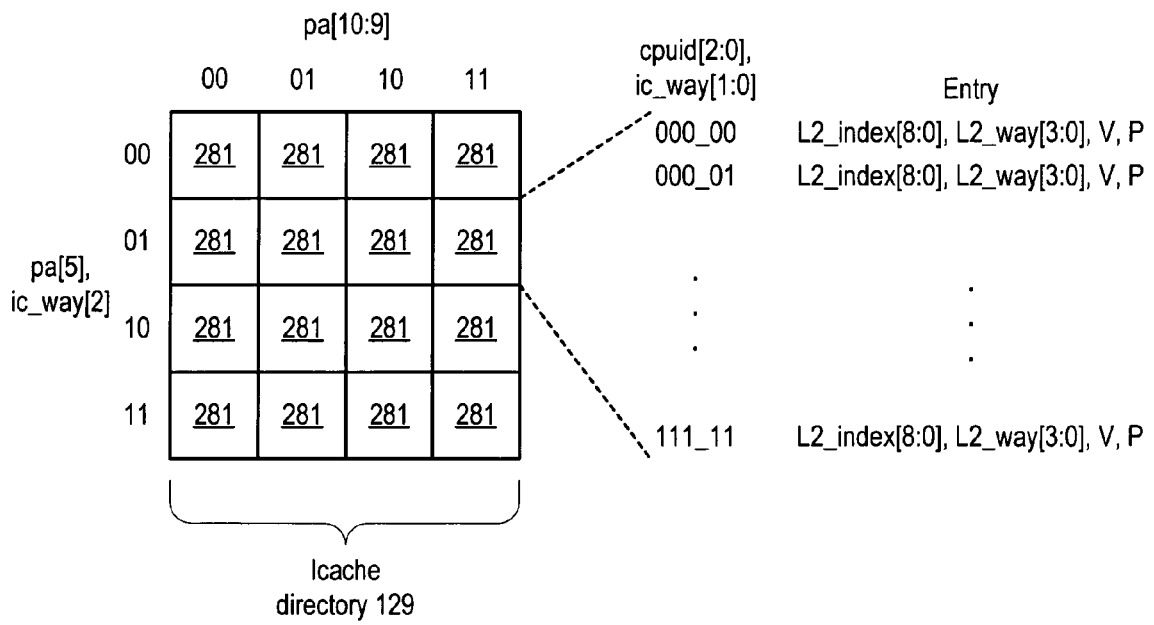
FIG. 13 is a block diagram illustrating an exemplary embodiment of an instruction cache directory.

In one embodiment, icache directories 129 may be configured similarly to dcache directories 127, and may operate similarly. One exemplary embodiment of an icache directory 129 is illustrated in FIG. 13. In the illustrated embodiment, icache directory 129 may be configured to include 16 panels 281 of 32 entries apiece, for a total of 512 entries each corresponding to a respective line within an instance of instruction caches 204. Operation of icache directory 129 may be substantially similar to that of dcache directory 127 described above, with the exception that differing instruction and data cache geometries may necessitate differences in decoding specific directory entries. Specifically, for the exemplary instruction cache geometry described above (8 ways, 64 sets, 32-byte lines) one fewer address bit may be necessary to decode the set index while one more bit may be necessary to decode the particular way in which a line resides, relative to the exemplary 4 way, 128 set data cache geometry discussed above. Correspondingly, in the illustrated embodiment, a specific panel 281 may be selected through the decoding of address bits pa[10, 9, 5] in combination with the most significant bit denoting the way of the instruction cache 204 in which a given line resides (denoted in FIG. 13 as ic_way[2]). A specific entry within the selected panel 281 may then be selected through the decoding of the unique core identifier, cpuid[2:0], as well as the remaining bits identifying the instruction cache way, ic_way[1:0]. In the illustrated embodiment, the information included within each entry may be similar to that included within entries of dcache directory 127 as described above. As mentioned previously, in other embodiments, icache directory 129 may be organized differently, and the decoding performed to select a particular entry may be performed in a different order or on different types of information.

As described above, in some embodiments of processor 10, individual instances of cache directories such as dcache directories 127 or icache directories 129 may be configured to store directory state information associated with caches of more than one processor core 100. Conversely, directory state information associated with a particular instruction cache 204 or data cache 235 may be stored by more than one instance of icache directories 129 or dcache directories 127. For example, an overlap of a bank select portion of a memory address with a cache set indexing portion of a memory address may result in the bank-based interleaving of directory entries as described above with respect to exemplary embodiments of dcache directories 127 and icache directories 129.

However, as noted above, not every L2 cache bank 125 or core 100 within processor 10 may be enabled for operation, for a variety of reasons including defects and productization decisions. In an embodiment where a directory associated with a given L2 cache bank 125 is hardwired to store directory state information associated with a portion of first-level caches distributed across several or all cores 100, simply disabling the given L2 cache bank and associated directory may result in a loss of coherence tracking functionality for the affected portions of the first-level caches. For example, in an embodiment where the bank select portion of a memory address corresponds to bits 8:6 of the address, disabling bank 4 of L2 cache 120 and its associated dcache and icache directories may result in an inability to track coherence state for all first-level cache lines within cores 100 with address bits pa[8:6] equal to 100. Disabling corresponding portions of first-level caches to preserve coherence may result in unacceptable performance degradation.

In one embodiment, in the event that fewer than all cache directories are enabled (e.g., due to selective disablement of certain cache banks 125), mapping logic 115 may be configured to completely map directory state information associated with first-level caches of enabled cores 100 to the enabled cache directories. That is, mapping logic 115 may be configured to modify the way in which individual cache lines map to particular cache directories, such that all first-level cache lines of enabled cores 100 have corresponding entries within the enabled cache directories. In some embodiments, completely mapping directory state information associated with first-level caches of enabled cores 100 may avoid having to partially or completely disable such caches in the event that fewer than all cache directories are enabled. It is contemplated that in some embodiments, all or a portion of mapping logic 115 relevant to mapping directory state information may be included within cache banks 125, dcache directories 127, icache directories 129, or elsewhere within L2 cache 120.

In some embodiments, mapping directory state information in the event of partial cache directory disablement may be simplified by constraining the number of cores 100 that may be enabled in such circumstances. For example, in one embodiment, the allowable number of cores 100 that may be enabled within a processor 10 may be constrained by the number of enabled directories for each type of first-level cache included in each core 100 (e.g., dcache directories 127, icache directories 129) or the number of enabled L2 cache banks 125. In some embodiments, the constraint may be expressed in finer-grained terms, such as the total available number of directory entries among the enabled cache directories. For example, in some embodiments cache directories may be configured to include redundant entries that may not be used when all directories are enabled, but which may be configured to support more lines of each icache/dcache in cores 100 in case some directories are disabled.

Figure 14:
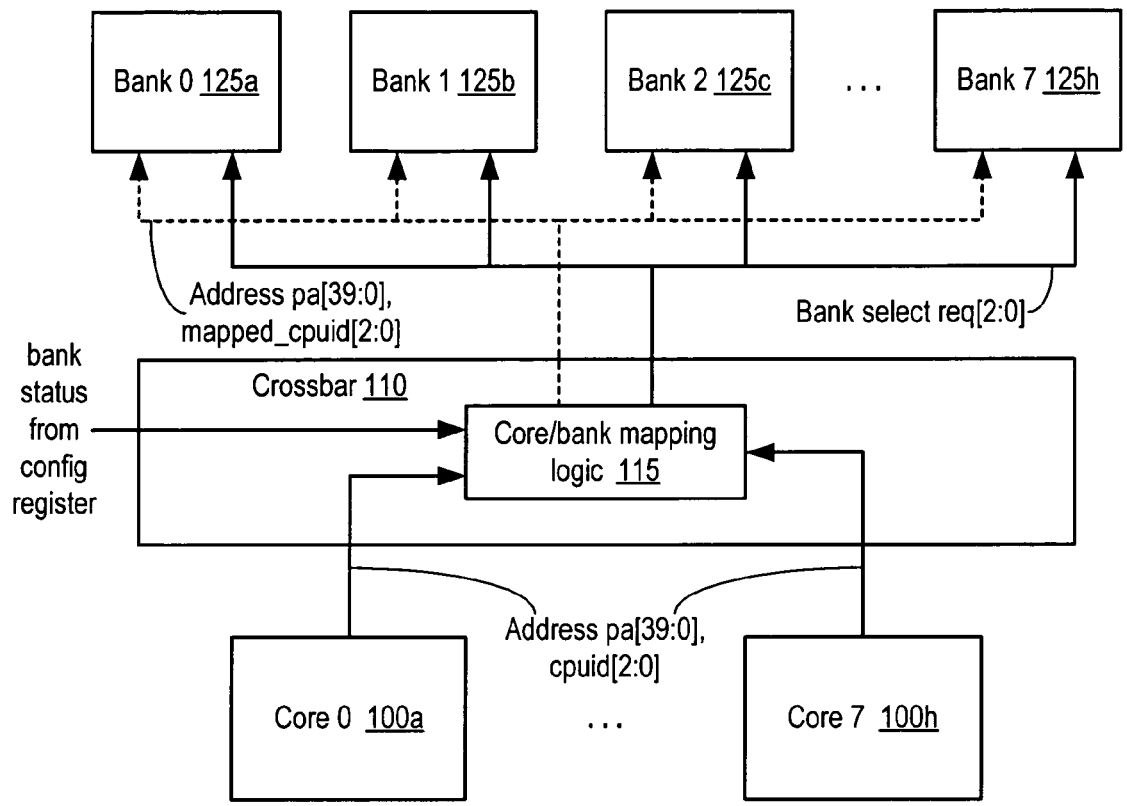
FIG. 14 is a block diagram illustrating another embodiment of core/bank mapping logic.

In an embodiment in which the number of allowable enabled cores 100 is constrained to be less than or equal to the number of enabled L2 cache banks 125, the directory mapping function implemented by mapping logic 115 may be simplified. One such embodiment of mapping logic 115 is illustrated in FIG. 14. As in the embodiment illustrated in FIG. 8, mapping logic may be configured to receive a memory address pa[39:0] as well as a unique identifier cpuid[2:0] from the various cores 100 within processor 10. In the illustrated embodiment, in addition to providing the bank select signal req[2:0], mapping logic may be configured to map certain portions of the bank select portion of the memory address onto the unique identifier in the event that fewer than all directories associated with L2 cache banks 125 are enabled. The resulting unique identifier is denoted in FIG. 14 as mapped_cpuid[2:0]. In the embodiment illustrated in FIG. 14, dcache directories 127 and icache directories 129 may be implemented within cache banks 125 as shown in FIG. 11. However, for clarity, the directories are not shown in FIG. 14.

As shown in FIG. 10 and table 1 above, in certain embodiments, bits of a bank select portion of a memory address that are used in some modes of operation may not participate in bank select signal decoding during other modes of operation. For example, in a 4-bank mode of operation, bits pa[7:6] may participate in bank select signal decoding while bit pa[8] may not, and in a 2-bank mode of operation, bit pa[6] may participate while bits pa[8:7] may not. However, the address bits not used during bank select signal decoding may still be relevant to the decoding of particular first-level cache lines. That is, even in partial-bank modes of operation, in some embodiments first-level data caches 235 and instruction caches 204 of enabled cores 100 may still depend on address bits pa[10:5] or pa[10:6] for set indexing, respectively.

In an embodiment where the number of enabled cores 100 is less than or equal to the number of enabled L2 cache banks 125, it is noted that not all bits of unique identifier cpuid[2:0] may be necessary to decode the enabled cores 100 in a two-bank or four-bank mode of operation, in which a respective maximum of two and four cores 100 may be enabled. That is, the number of enabled cores 100 in a partial-bank mode of operation may be uniquely represented in principle by a reduced number of bits relative to a full-bank mode of operation. Correspondingly, in one embodiment mapping logic 115 may be configured to map the unique identifier cpuid[2:0] received from a given enabled core 100 to a unique value within the reduced number of bits applicable to a particular partial-bank mode of operation. For example, during a four-bank mode of operation, mapping logic 115 may be configured to map the unique identifiers of the four enabled cores 100 (which, in one embodiment, may be any functional ones of the implemented cores 100) to respective ones of the four values 00, 01, 10 or 11. These values may then be represented within a portion of the mapped_cpuid[2:0] signal.

Address mapping logic 115 may additionally be configured to map the bit or bits of the bank select portion of the memory address that do not participate in bank select signal decoding during a partial-bank mode of operation to the unused bit or bits of the mapped unique identifier mapped_cpuid[2:0]. For example, in one embodiment, only one or two bits of the mapped_cpuid[2:0] signal may be used by the mapped unique identifier during a two- or four-bank mode of operation, respectively. Correspondingly, bits pa[8:7] or bit pa[8] may be mapped to the otherwise unused bits of the mapped_cpuid[2:0] signal.

In one embodiment, this mapping may enable directory information for all lines of first-level caches within enabled cores 100 to be represented by directories associated with enabled L2 cache banks 125. Referring to the exemplary embodiments of dcache directory 127 and icache directory 129 described above, it is noted that during a full-bank mode of operation, all address bits needed to decode a particular first-level cache set (e.g., pa[10:5] or pa[10:6] for data or instruction caches, respectively) may be accounted for, with certain address bits overlapping with a bank select portion of the memory address. In a partial-bank mode of operation, some of the overlap may be lost as certain address bits are omitted from the bank select signal decoding. However, mapping omitted ones of these bits to part of the unique identifier cpuid[2:0] may effectively restore the ability to uniquely map a given line of a first-level cache within the enabled directories.

For example, in one embodiment, during a two-bank mode of operation, selection of a panel 280 within dcache directory 127 may be performed dependent on address bits pa[10,9,5,4] as described above. However, during this mode of operation, selection of cache bank 125 (and correspondingly, dcache directory 127) may be performed dependent upon address bit pa[6] as shown above, while address bits pa[8:7] may be mapped onto a portion of mapped_cpuid[2:0] and correspondingly reflected in the selection of a particular entry within the selected directory panel 280. In such an embodiment, complete decoding of the first-level cache set (via address bits pa[10:5]), enabled core 100 (via mapped_cpuid[2:0]) and first-level cache way (via dc_way[1:0], described above) may enable unique mapping of each first-level cache line for coherence state tracking. It is contemplated that in some embodiments, the number of enabled cores 100 may be greater than the number of enabled L2 cache banks 125 during a partial-bank mode of operation, for example if the cache directories include redundant entries to which mapping logic 115 can map additional first-level cache lines.

Figure 15:
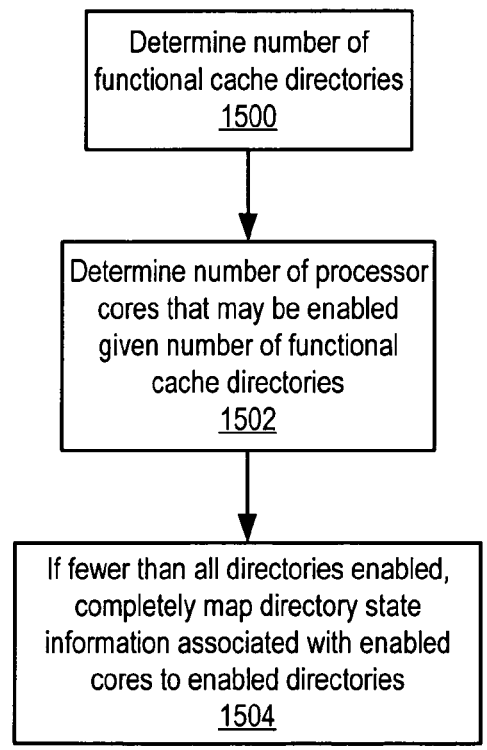
FIG. 15 is a flow diagram of one embodiment of a method of completely mapping directory state information to cache directories when fewer than all directories are enabled.

A flow chart illustrating one embodiment of a method of completely mapping directory state information to cache directories when fewer than all directories are enabled is shown in FIG. 15. Referring collectively to FIG. 1-15, operation begins in block 1500 where the number of functional cache directories is determined. For example, in one embodiment, the number of functional data and instruction cache directories may correspond to the number of enabled L2 cache banks 125, which may be reflected by configuration register 175.

A maximum number of processor cores 100 that may be enabled given the number of functional cache directories is then determined (block 1502). For example, the number of enabled processor cores 100 may be constrained to be less than or equal to the number of enabled L2 cache banks 125 in some embodiments, or may be constrained to be greater than the number of enabled L2 cache banks 125 by less than a particular amount in other embodiments. It is contemplated that in some embodiments, block 1500-1502 may be performed once during post-manufacturing testing of processor 10 and reflected in the appropriate configuration of fuses 195. In other embodiments, cores 100 may be dynamically enabled by software or firmware (e.g., at processor boot time).

If fewer than all cache directories are enabled, directory state information associated with first-level caches of enabled cores 100 is completely mapped to enabled cache directories (block 1504). For example, in one embodiment mapping logic 115 may be configured to map address bits used for first-level cache line decoding but not used for cache bank 125 selection to unused bits of a unique core identifier, as described above.

Partitioning Processors into Virtual Processors

In some embodiments, the techniques and methods described above may be employed to configure instances of processor 10 for operation even if some processor resources, such as L2 cache banks 125 or processor cores 100, for example, are disabled due to defects, productization decisions, or for other reasons. However, in some embodiments, these techniques may also be employed to virtualize processor resources even in processors 10 in which all resources are fully enabled. For example, an instance of processor 10 including eight cores 100 and eight L2 cache banks 125, such as described above and illustrated in FIG. 1, may in some embodiments be configured with only two, four or another number of L2 banks 125 and a corresponding number of cores 100 enabled. The processor 10 may then operate in a partial-bank or partial-core mode, and mapping logic 115 may be configured to appropriately map enabled cores 100 to enabled L2 cache banks 125 through appropriate mapping of bank select address bits and core unique identifier bits as described above.

Figure 16:
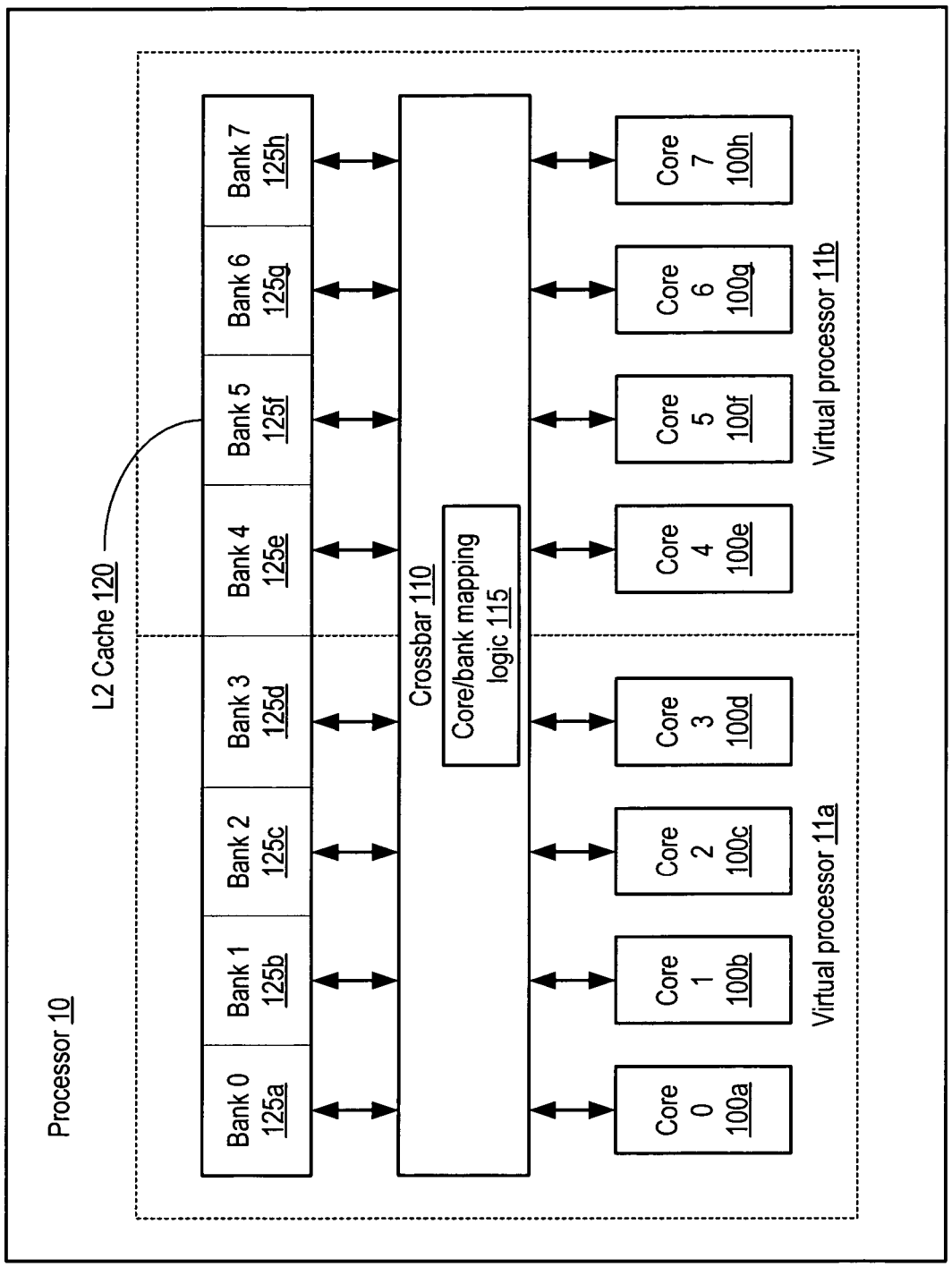
FIG. 16 is a block diagram of one embodiment of a processor configured to include multiple virtual processors.

By extension, in some embodiments a processor 10 including a given number of functional resources may be configured to operate as multiple virtual instances of a processor 10, where each virtual processor 10 includes fewer than the given number of functional resources. For example, in some embodiments a processor 10 including eight cores 100 and L2 cache banks 125 may be configured to operate as two virtual processors 10 each including four cores 100 and cache banks 125, or as four virtual processors 10 each including two cores 100 and cache banks 125, or some other (possibly asymmetric) combination of virtual processors 10. One exemplary embodiment of a processor 10 configured to include multiple virtual processors is illustrated in FIG. 16. In the illustrated embodiment, each of virtual processors 11a-b includes four cores 100 and four cache banks 125, with cores 100 and cache banks 125 coupled to mapping logic 115 via crossbar 110 as described above. Specifically, virtual processor 11a includes cores 100a-d and cache banks 125a-d, while virtual processor 11b includes cores 100e-h and cache banks 125e-h. As previously noted, other configurations of virtual processors 11 including different numbers of cores 100 and cache banks 125 are possible and contemplated. Additionally, different groupings of cores 100 and cache banks 125 as virtual processors 11 are possible and contemplated.

In the illustrated embodiment, mapping logic may be configured to map the resources within each virtual processor 11 in a manner transparent to other virtual processors 11. That is, cache banks 125 within one virtual processor 11 may not be visible to cores 100 within another virtual processor 11, and vice versa. Specifically, in one embodiment, processor 10 may include multiple, non-overlapping subsets of cores 100 and cache banks 125, where each virtual processor 11 includes a corresponding subset of cores 100 and a corresponding subset of cache banks 125. During one mode of operation, mapping logic 115 may be configured to map a cache bank portion of a memory address specified by any one of a first subset of cores 100 to any one of a first subset of cache banks 125, where the first subset of cores and the first subset of cache banks are included in a first virtual processor 11. Similarly, mapping logic 115 may be configured to map a cache bank portion of a memory address specified by any one of a second subset of cores 100 to any one of a second subset of cache banks 125, where the second subset of cores and the second subset of cache banks are included in a second virtual processor 11. Address mapping logic 115 may be configuring to perform similar mappings for as many virtual processors 11 including subsets of cores 100 and cache banks 125 as may be provided within processor 10.

The mapping performed by mapping logic 115 may in one embodiment be similar to the mapping described above and shown in Table 1. In some embodiments, mapping logic 115 may be configured to maintain additional state information, such as one or more configuration registers, that may be configured to indicate precisely which cores 100 and cache banks 125 correspond to which virtual processors 11, and to accordingly implement the appropriate mapping. In some embodiments, mapping logic 115 may also be configured to perform cache directory mapping for cores 100 within a given virtual processor 11 in a manner similar to that described above in conjunction with the descriptions of FIGS. 11-15. It is contemplated that in some embodiments, processor 10 may support multiple distinct modes of operation in which different configurations of virtual processors 11 may be established. It is further contemplated that processor 10 may support a mode of operation in which no virtualization is performed, which may be functionally equivalent to a mode in which a single virtual processor 11 is defined to include all available cores 100 and banks 125 within processor 10.

In some embodiments, each virtual processor 11 may be independently programmable and may function essentially independently of other virtual processors 11. Thus, for example, a processor 10 including eight cores 100 may be configured as two virtual processors 11 including four cores 100 apiece, where each virtual processor 11 may be configured to operate as though it were a discrete instance of a processor 10 that included only four cores 100. Additionally, in some embodiments, different virtual processors 11 may be configured to execute different types of software, such as different operating systems, applications, etc. For example, in one embodiment, one virtual processor 11 may be configured to execute a version of the Solaris operating system on its cores 100, while another virtual processor 11 may be configured to execute a version of the Linux operating system on its cores 100. As noted above, the execution of one virtual processor 11 may be isolated from and transparent to the execution of other virtual processors 11.

Figure 17:
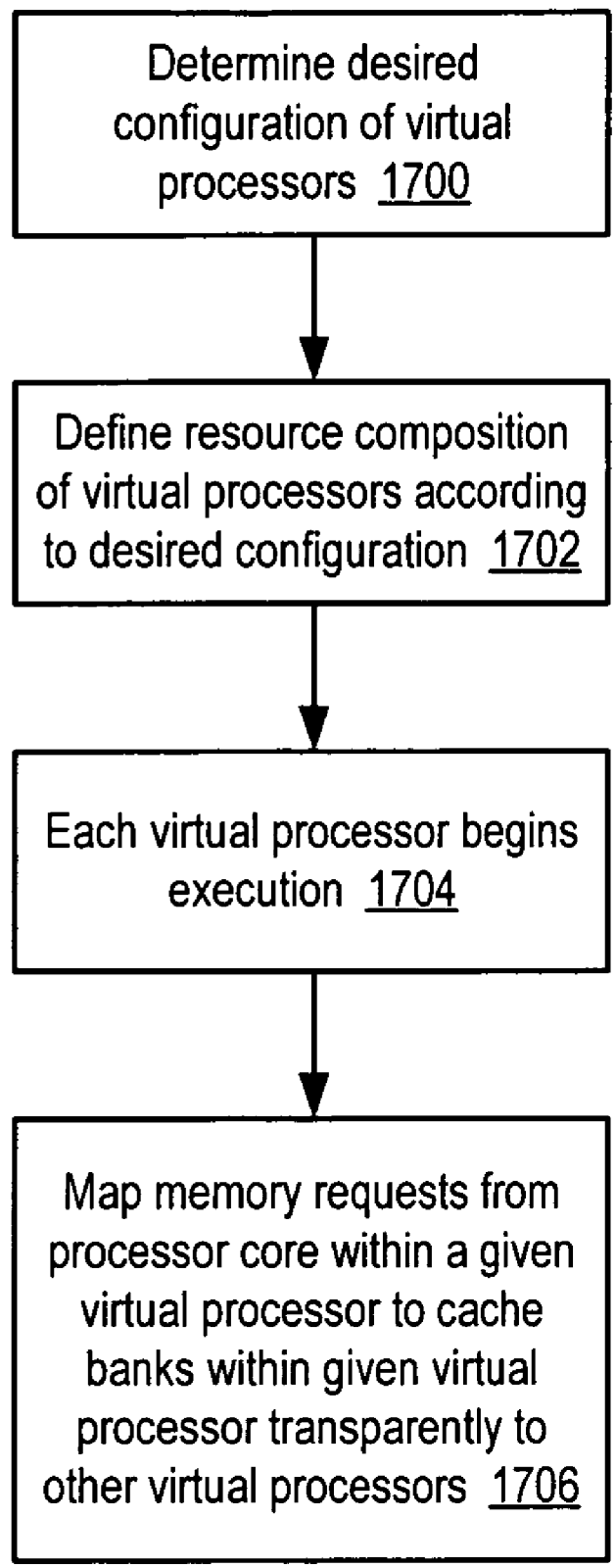
FIG. 17 is a flow diagram of one embodiment of a method of configuring multiple virtual processors within a processor.

One embodiment of a method of configuring multiple virtual processors 11 within a given processor 10 is illustrated in FIG. 17. Referring collectively to FIGS. 1-17, operation begins in block 1700 where the desired configuration of virtual processors 11 is determined. For example, in some embodiments, configuration register 175 may include an interface through which boot software may specify that processor 10 is to be configured into a certain number of virtual processors 11 each having certain resources.

Subsequently, the resource composition of one or more virtual processors 11 is defined according to the desired configuration (block 1702). For example, in one embodiment, the subsets of cores 100 and cache banks 125 that correspond to a given virtual processor 11 may be configured according to the number of available cores and cache banks, the number of cores and cache banks specified for the given virtual processor 11, or other relevant factors. In some embodiments, resource composition of virtual processors 11 may also be defined during the boot process of processor 10.

After virtual processors 11 have been configured, each virtual processor 11 begins execution (block 1704). For example, in one embodiment, the boot process of processor 10 may direct each virtual processor 11 to begin executing a bootstrap routine associated with a particular operating system.

During the course of operation of virtual processors 11, memory requests generated by a particular core 100 within a particular virtual processor 11 are mapped to a corresponding cache bank 125 within the particular virtual processor 11 in a manner transparent to other virtual processors 11 (block 1706). For example, in response to a first-level cache miss of a core 100 within a given virtual processor 11, mapping logic 115 may be configured to map the bank select portion of the memory address associated with the cache miss to a particular cache bank 125 associated with the given virtual processor 11. Further, by maintaining separate mappings for each virtual processor 11, mapping logic 115 may be configured to prevent cores 100 within one virtual processor 11 from accessing cache banks 125 associated with other virtual processors 11.

It is noted that any of the methods and techniques described above may be applied to any level within a memory hierarchy, and that in some embodiments, additional caches may exist above the first-level caches or below the L2 cache within processor 10. It is intended that the descriptive terms "first-level" and "second-level" denote caches at different levels of the memory hierarchy relative to one another rather than caches at absolute levels within the memory hierarchy. For example, in one embodiment the first-level and second-level caches described above may actually be second- and third-level caches within the overall memory hierarchy implemented by processor 10.

Exemplary System Embodiment

Figure 18:
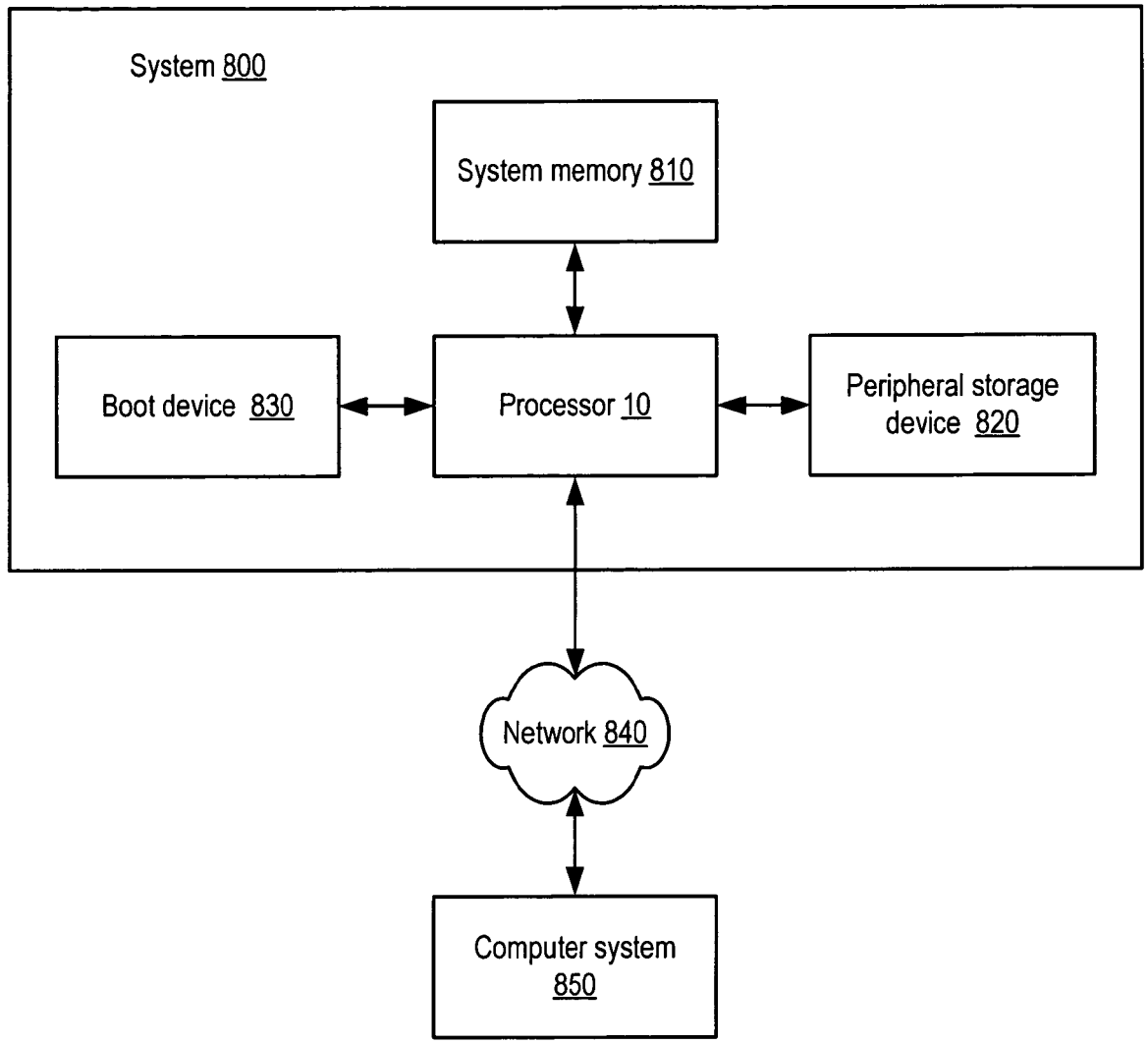
FIG. 18 is a block diagram of one embodiment of a computer system.

As described above, in some embodiments processor 10 of FIG. 1 may be configured to interface with a number of external devices. One embodiment of a system including processor 10 is illustrated in FIG. 18. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A processor, comprising:
   a cache including a plurality of cache banks;
   a plurality of processor cores, wherein during a first mode of processor operation, each of said plurality of processor cores is configurable to access any of said plurality of cache banks; and
   core/bank mapping logic coupled to said plurality of cache banks and said plurality of processor cores;
   wherein during a second mode of processor operation, said core/bank mapping logic is configured to implement a plurality of virtual processors within said processor;
   wherein a first one of said plurality of virtual processors includes a first subset of said plurality of processor cores and a first subset of said cache banks;
   wherein a second one of said plurality of virtual processors includes a second subset of said plurality of processor cores and a second subset of said cache banks;
   wherein processor cores and cache banks included in any one of said virtual processors are distinct from processor cores and cache banks included in any other one of said virtual processors;
   wherein said processor is operable to store state information indicating which of said plurality of processor cores and which of said plurality of cache banks are included in which ones of said plurality of virtual processors dependent upon programmable processor configuration information; and
   wherein each of said plurality of virtual processors is configurable by said core/bank mapping logic such that in different configurations of said programmable processor configuration information, a given one of said virtual processors includes different numbers of ones of said plurality of processor cores or different numbers of ones of said plurality of cache banks, and wherein said core/bank mapping logic is configured to prevent processor cores included in said given virtual processor from accessing cache banks included in a different virtual processor.

2. The processor as recited in claim 1, wherein during said second mode of operation, said core/bank mapping logic is configured to map a cache bank portion of a memory address specified by any one of said first subset of said processor cores to any one of said first subset of said cache banks and to map a cache bank portion of a memory address specified by any one of said second subset of said processor cores to any one of said second subset of said cache banks.

3. The processor as recited in claim 1, wherein each one of said virtual processors is programmable independently of the other virtual processors.

4. The processor as recited in claim 3, wherein said first and said second virtual processors are configured to respectively execute two different operating systems.

5. The processor as recited in claim 4, wherein one of said two different operating systems includes an operating system compliant with a version of Solaris operating system.

6. The processor as recited in claim 4, wherein one of said two different operating systems includes an operating system compliant with a version of Linux operating system.

7. A method, comprising:
   determining a respective desired configuration of each of a plurality of virtual processors, wherein a given respective desired configuration includes a specification of a respective subset of a plurality of processor cores of a processor and a respective subset of a plurality of cache banks, and wherein said plurality of processor cores and said plurality of cache banks are implemented within a single processor;
   dependent upon programmable processor configuration information, defining each of said virtual processors to include said respective subsets of processor cores and cache banks according to said respective desired configuration, such that in different configurations of said programmable processor configuration information, a given one of said virtual processors includes different numbers of ones of said plurality of processor cores or different numbers of ones of said plurality of cache banks, wherein said processor is operable to store state information indicating which of said plurality of processor cores and which of said plurality of cache banks are included in which ones of said virtual processors dependent upon said programmable processor configuration information; and
   separately executing program instructions on each of said virtual processors; and
   core/bank mapping logic within said processor preventing processor cores included in said given virtual processor from accessing cache banks included in a different virtual processor, wherein said core/bank mapping logic is coupled to said plurality of cache banks and said plurality of processor cores and is configured to implement said virtual processors within said processor;

wherein processor cores and cache banks included in any one of said virtual processors are distinct from processor cores and cache banks included in any other one of said virtual processors.

8. The method as recited in claim 7, further comprising:

transparently to said second virtual processor, mapping a cache bank portion of a memory address specified by any one of said processor cores included in said first virtual processor to any one of said cache banks included in said first virtual processor; and transparently to said first virtual processor, mapping a cache bank portion of a memory address specified by any one of said processor cores included in said second virtual processor to any one of said cache banks included in said second virtual processor.

9. The method as recited in claim 7, wherein said first and said second virtual processors are configured to respectively execute two different operating systems.

10. The method as recited in claim 9, wherein one of said two different operating systems includes an operating system compliant with a version of Solaris operating system.

11. The method as recited in claim 9, wherein one of said two different operating systems includes an operating system compliant with a version of Linux operating system.

12. A system, comprising:

a system memory; and a processor coupled to said system memory, wherein the processor includes:

a cache including a plurality of cache banks;

a plurality of processor cores, wherein during a first mode of processor operation, each of said plurality of processor cores is configurable to access any of said plurality of cache banks; and core/bank mapping logic coupled to said plurality of cache banks and said plurality of processor cores;

wherein during a second mode of processor operation, said core/bank mapping logic is configured to implement a plurality of virtual processors within said processor;

wherein a first one of said plurality of virtual processors includes a first subset of said plurality of processor cores and a first subset of said cache banks;

wherein a second one of said plurality of virtual processors includes a second subset of said plurality of processor cores and a second subset of said cache banks;

wherein processor cores and cache banks included in any one of said virtual processors are distinct from processor cores and cache banks included in any other one of said virtual processors;

wherein said processor is operable to store state information indicating which of said plurality of processor cores and which of said plurality of cache banks are included in which ones of said plurality of virtual processors dependent upon programmable processor configuration information; and wherein each of said plurality of virtual processors is configurable by said core/bank mapping logic such that in different configurations of said programmable processor configuration information, a given one of said virtual processors includes different numbers of ones of said plurality of processor cores or different numbers of ones of said plurality of cache banks, and wherein said core/bank mapping logic is configured to prevent processor cores included in said given virtual processor from accessing cache banks included in a different virtual processor.

13. The system as recited in claim 12, wherein during said second mode of operation, said core/bank mapping logic is configured to map a cache bank portion of a memory address specified by any one of said first subset of said processor cores to any one of said first subset of said cache banks and to map a cache bank portion of a memory address specified by any one of said second subset of said processor cores to any one of said second subset of said cache banks.

14. The system as recited in claim 12, wherein each one of said virtual processors is programmable independently of the other virtual processors.

15. The system as recited in claim 14, wherein said first and said second virtual processors are configured to respectively execute two different operating systems.

16. The system as recited in claim 15, wherein one of said two different operating systems includes an operating system compliant with a version of Solaris operating system.

17. The system as recited in claim 15, wherein one of said two different operating systems includes an operating system compliant with a version of Linux operating system.

\* \* \* \* \*